(12) United States Patent
Khajehnejad

(10) Patent No.: US 11,676,089 B2
(45) Date of Patent: *Jun. 13, 2023

(54) TECHNIQUES FOR OBTAINING SOLUTIONS TO BLACK-BOX OPTIMIZATION PROBLEMS

(71) Applicant: Exoptimum LLC, Hoboken, NJ (US)

(72) Inventor: Mohammadamin Khajehnejad, Hoboken, NJ (US)

(73) Assignee: EXOPTIMUM LLC, Hoboken, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/891,726

(22) Filed: Aug. 19, 2022

(65) Prior Publication Data

US 2022/0391798 A1 Dec. 8, 2022

Related U.S. Application Data

(63) Continuation of application No. 17/363,799, filed on Jun. 30, 2021, now Pat. No. 11,455,589.

(Continued)

(51) Int. Cl.
*G06Q 10/00* (2023.01)
*G06Q 10/0637* (2023.01)
(Continued)

(52) U.S. Cl.
CPC ......... *G06Q 10/0637* (2013.01); *G06Q 10/04* (2013.01); *G06Q 30/01* (2013.01)

(58) Field of Classification Search
None
See application file for complete search history.

(56) References Cited

U.S. PATENT DOCUMENTS

2005/0262230 A1* 11/2005 Liu .............. G06F 11/3452
714/E11.197
2008/0270240 A1* 10/2008 Chu .............. G06Q 30/0239
434/350

(Continued)

OTHER PUBLICATIONS

Thomas Hemker et al. (Derivative Free Surrogate Optimization for Mixed-Integer Nonlinear Black Box Problems in Engineering, Dissertation, 2008). (Year: 2008).*

(Continued)

*Primary Examiner* — Hafiz A Kassim
(74) *Attorney, Agent, or Firm* — NovoTechIP International PLLC

(57) ABSTRACT

A data processing system for providing a black-box optimization exchange implements receiving a black-box optimization problem, presenting the problem on a user interface, receiving a candidate solution, inserting the candidate solution into a candidate solution queue, providing the candidate solution to a simulator service cause the simulator service to execute an objective function associated with the black-box optimization problem on the candidate solution, determining an improvement value provided by the candidate solution by analyzing one or more previously determined solutions to the first black-box optimization problem and the first objective value to determine an amount of improvement provided by the candidate solution, determining a reward by analyzing the improvement value using a reward function associated with the black-box optimization problem, and notifying the user that provided the candidate solution that the candidate solution has earned the user the reward.

11 Claims, 21 Drawing Sheets

Related U.S. Application Data

(60) Provisional application No. 63/053,378, filed on Jul. 17, 2020.

(51) Int. Cl.
*G06Q 30/01* (2023.01)
*G06Q 10/04* (2023.01)

(56) References Cited

U.S. PATENT DOCUMENTS

| | | | | |
|---|---|---|---|---|
| 2009/0112780 A1* | 4/2009 | Chen | ................... | G06F 11/3409 706/19 |
| 2010/0268651 A1* | 10/2010 | Raskina | ............... | G06Q 50/188 705/7.33 |
| 2011/0153507 A1* | 6/2011 | Murthy | ................. | G06F 9/5061 705/348 |
| 2011/0161264 A1* | 6/2011 | Cantin | ................... | G06N 3/126 706/13 |
| 2011/0173327 A1* | 7/2011 | Chen | .................... | G06F 9/5066 709/226 |
| 2011/0282641 A1* | 11/2011 | Xenos | ..................... | G06F 30/20 703/19 |
| 2014/0272884 A1* | 9/2014 | Allen | ....................... | G09B 7/04 434/322 |
| 2015/0206246 A1* | 7/2015 | Lange | .................... | G06Q 50/01 705/36 R |
| 2016/0335582 A1* | 11/2016 | Suntinger | ...... | G06Q 10/063112 |
| 2020/0167691 A1* | 5/2020 | Golovin | ................... | G06N 7/01 |

OTHER PUBLICATIONS

Elena Pastorino et al. (Optimal Job Design and Career Dynamics in the Presence of Uncertainty, Jun. 2004) . (Year: 2004).*

M.P. Fantia, G. Iacobellis, W. Ukovich, V. Boschian, G. Georgoulas, C. Stylios et al. (A simulation based Decision Support System for logistics management, Journal of Computational Science 10 (2015) 86-96)). (Year: 2015).*

Baker Abdalhaq et al. (Black Box Optimization Framework, Master Thesis, 2001). (Year: 2001).*

Andrea Cassioli and Fabio Schoen et al. (Global optimization of expensive black box problems with a known lower bound, Springer Science + Business Media, LLC. 2011). (Year: 2011).*

Mark S. Squillante et al. (A Two-Phase Approach for Stochastic Optimization of Complex Business Processes, Proceedings of the 2013 Winter Simulation Conference). (Year: 2013).*

Mahmoud Awad and Daniel A. Menasce et al. (Deriving Parameters for Open and Closed QN Models of Operational Systems Through Black Box Optimization, 2017 ACM . ISBN 978-1-4503-4404-3/ 17/04 )) . (Year: 2017).*

* cited by examiner

Time $t_4$: Simulator outputs results and updates dashboard

| Problem Identifier 810 | Problem Start Time 815 | Problem End Time 820 | Problem Description 825 |
|---|---|---|---|
| 0001 | 2019-03-29 T 09:17:24.135Z | 2019-03-29 T 09:23:35.115Z | The problem presented is to optimize ... |

| Problem Identifier 810 | Candidate Solution Identifier 830 | Candidate Solution Value 835 | Candidate Solution Received 840 | Candidate Solution Result 845 | Candidate Solution Reward 850 | Candidate Solution Result Determined 855 |
|---|---|---|---|---|---|---|
| 0001 | 0001 | [1,0,1,2,4,3,1,2,1,8,9,10] | 2019-03-29 T 11:23:45.115Z | 0.9 | 1.50 | 2019-03-29 T 11:23:45.115Z |

Search

The following problems have been posted and are currently accepting candidate solutions:

Sort By: Most Recent (1) Electric Grid Optimization – posted June 2, 2021 at 11:10 am EST  Details (2) Airline Network Optimization – posted June 2, 2021 at 5:10 am EST  Details (3) Flow Dynamics Optimization – posted June 1, 2021 at 03:31 pm EST  Details (4) Image Object Recognition – posted May 30, 2021 at 06:30 pm EST  Details (5) Shipping Network Optimization – posted May 30, 2021 at 12:10 am EST  Details

Problem Details

A solution for optimizing a shipping network is being sought to help the shipper to minimize fuel costs and shipping times between points on the network. The input to the is a vector of 500 integer values representing...

Problem Queue

| |
|---|
| (1,0) |
| (2,0) |
| |
| |
| |
| |
| |
| |

The Problem Queue shows candidate solutions that have been submitted for consideration by the requestor of the solution but have not yet been processed.

You currently have not submitted any candidate solutions for consideration.

Problem Dashboard

| | |
|---|---|
| (0,0) | 0 |
| (0,1) | -1 |
| (2,2) | -5 |
| (1,1) | 0 |
| | |
| | |

The Problem Dashboard shows candidate solutions that have been processed by the requestor (left column) and the associated results produced by the candidate solution (right column).

Submit Candidate Solution

Cancel Candidate Solution

FIG. 10

Problem Details

A solution for optimizing a shipping network is being sought to help the shipper to minimize fuel costs and shipping times between points on the network. The input to the is a vector of 500 integer values representing...

Problem Queue

| (1,0) |
|-------|
| (2,0) |
|       |
|       |
|       |
|       |
|       |

1135

The Problem Queue shows candidate solutions that have been submitted for consideration but have not yet been processed.

You currently have not submitted any candidate solutions for consideration.

Problem Dashboard

| (0,0) | 0  |
|-------|----|
| (0,1) | -1 |
| (2,2) | -5 |
| (1,1) | 0  |
|       |    |
|       |    |
|       |    |

1140

The Problem Dashboard shows candidate solutions that have been processed by the requestor (left column) and the associated results produced by the candidate solution (right column).

( Process Candidate Solution(s) ) 1110

TECHNIQUES FOR OBTAINING SOLUTIONS TO BLACK-BOX OPTIMIZATION PROBLEMS

CROSS-REFERENCE TO RELATED APPLICATIONS

This application claims the benefit of priority from pending U.S. patent application Ser. No. 17/363,799 filed on Jun. 30, 2021, and entitled "Techniques for Black-Box Optimization Problems" which claims the benefit of priority from U.S. Provisional Patent Application Ser. No. 63/053,378, filed on Jul. 17, 2020, and entitled "A virtual exchange for black-box optimization."

BACKGROUND

Most computational problem can be expressed as some form of numerical optimization. With the growth of computation in scientific and engineering applications, black-box (derivative-free) optimization has become a key component of almost every numerical (software or hardware) system. Real-world optimization problems are extremely diverse in terms of the nature of the objective function, problem dimensionality, and complexity. Functions may be continuous or discontinuous, discrete or mixed, smooth or non-smooth, convex or nonconvex, extremely costly or slow to calculate, or easy to compute but with a vast number of parameters. Each optimization problem has a specific set of characteristics vis-à-vis those aspects and thus poses a unique computational challenge. Consequently, the winning derivative-free optimization strategy can vary widely from one optimization problem to another. Moreover, no single optimization method, no matter how well-tuned, dominates over all other methods in the general sense of black-box optimization. What tends to work the best in general is an ensemble of various techniques with additional layers to fine-tune the winning strategy or sub-select the method pool dynamically per problem, thereby optimizing the optimization. Thus, designing a state-of-the-art super optimizer is highly challenging.

Black-box optimization problems may occur in many scenarios, such as but not limited to energy production and/or distribution, routing and/or scheduling for transportation and/or shipping, supply-chain management, risk management and finance, genome search and design, engineering design of materials, structures, hardware or software, and/or other such scenarios involving complex problems. Black-box optimization problems may be quite complex due to the dimensionality of the problem, the time-consuming nature of the calculations associated with the problem, and/or for other reasons associated with the problem to be optimized. Without mathematical formulation, explicit relationship or prior knowledge on the objective function, no method can guarantee to efficiently solve a given optimization problem. Heuristic methods are generally invoked to solve generic black-box optimization problems which involve a fair amount of fine-tuning of parameters for the circumstances, in addition to substantial effort and research to pick the correct model or ensemble of models. However, even when the exact method and configurations are specified, the implementation may require significant efforts for parallelization (distributed optimization) and learning from past data (meta-model) and software and hardware interfaces. These activities may have to be repeated for new problems. However, optimizing such black-box optimization problems may provide results that may significantly improve resource utilization, provide significant cost savings, and/or provide other benefits. Hence, there is a need for improved systems and methods that enable a technical solution for solving black-box optimization problems, in which the solutions are more efficient and apply to more diverse problems.

SUMMARY

An example data processing system according to the disclosure may include a processor and a machine-readable medium storing executable instructions. The instructions when executed, cause the processor to perform operations including receiving first problem information from a first computing device of a first user, the first problem information identifying a first objective function representing a first black-box optimization problem for which a solution is being requested from one or more second users, and input information indicating one or more inputs to the first objective function; causing the first problem information to be presented on a first problem user interface of a virtual exchange, the virtual exchange reducing one or more of computing, network, and memory resource for optimizing objective functions associated with black-box problems by providing a collaborative environment in which users submit candidate solutions for optimizing a respective objective function associated with a respective black-box problem; receiving a first candidate solution to the first objective function from a second computing device of a second user, wherein the first candidate solution includes one or more first candidate input values to be provided as an input to the objective function; storing information associated with the first candidate solution in a candidate solution information data structure stored in a memory of the data processing system, wherein storing the information in the candidate solution information data structure includes: determining that the first candidate solution exceeds a size of a candidate solution field included in the candidate solution data structure allocated for storing the first candidate solution, storing the first candidate solution in a memory location external to the candidate information data structure, and inserting a link to the memory location in the candidate solution field of the candidate solution information data structure; providing the first candidate solution as the input to a first simulator service in response to the candidate solution request; obtaining, as an output from the first simulator of the simulator service, a first objective value generated by the first objective function responsive to executing the first objective function on the first candidate solution; determining a first improvement value provided by the first candidate solution by analyzing one or more previously determined solutions to the first black-box optimization problem and the first objective value to determine an amount of improvement provided by the first candidate solution; and compensating the second user for the first candidate solution based on the improvement value provided by the first candidate solution.

An example method implemented in a data processing system for operating a virtual exchange for obtaining solutions to black-box optimization problems includes receiving first problem information from a first computing device of a first user, the first problem information identifying a first objective function representing a first black-box optimization problem for which a solution is being requested from one or more second users, and input information indicating one or more inputs to the first objective function; causing the first problem information to be presented on a first problem user interface of a virtual exchange, the virtual exchange reducing one or more of computing, network, and memory resource for optimizing objective functions associated with black-box problems by providing a collaborative environment in which users submit candidate solutions for optimizing a respective objective function associated with a respective black-box problem; receiving a first candidate solution to the first objective function from a second computing device of a second user, wherein the first candidate solution includes one or more first candidate input values to be provided as an input to the objective function; storing information associated with the first candidate solution in a candidate solution information data structure stored in a memory of the data processing system, wherein storing the information in the candidate solution information data structure includes: determining that the first candidate solution exceeds a size of a candidate solution field included in the candidate solution data structure allocated for storing the first candidate solution, storing the first candidate solution in a memory location external to the candidate information data structure, and inserting a link to the memory location in the candidate solution field of the candidate solution information data structure; providing the first candidate solution as the input to a first simulator service in response to the candidate solution request; obtaining, as an output from the first simulator of the simulator service, a first objective value generated by the first objective function responsive to executing the first objective function on the first candidate solution; determining a first improvement value provided by the first candidate solution by analyzing one or more previously determined solutions to the first black-box optimization problem and the first objective value to determine an amount of improvement provided by the first candidate solution; and compensating the second user for the first candidate solution based on the improvement value provided by the first candidate solution.

An example machine-readable storage medium according to the disclosure on which are stored instructions which when executed cause a processor of a programmable device to perform operations of receiving first problem information from a first computing device of a first user, the first problem information identifying a first objective function representing a first black-box optimization problem for which a solution is being requested from one or more second users, and input information indicating one or more inputs to the first objective function; causing the first problem information to be presented on a first problem user interface of a virtual exchange, the virtual exchange reducing one or more of computing, network, and memory resource for optimizing objective functions associated with black-box problems by providing a collaborative environment in which users submit candidate solutions for optimizing a respective objective function associated with a respective black-box problem; receiving a first candidate solution to the first objective function from a second computing device of a second user, wherein the first candidate solution includes one or more first candidate input values to be provided as an input to the objective function; storing information associated with the first candidate solution in a candidate solution information data structure stored in a memory of the data processing system, wherein storing the information in the candidate solution information data structure includes: determining that the first candidate solution exceeds a size of a candidate solution field included in the candidate solution data structure allocated for storing the first candidate solution, storing the first candidate solution in a memory location external to the candidate information data structure, and inserting a link to the memory location in the candidate solution field of the candidate solution information data structure; providing the first candidate solution as the input to a first simulator service in response to the candidate solution request; obtaining, as an output from the first simulator of the simulator service, a first objective value generated by the first objective function responsive to executing the first objective function on the first candidate solution; determining a first improvement value provided by the first candidate solution by analyzing one or more previously determined solutions to the first black-box optimization problem and the first objective value to determine an amount of improvement provided by the first candidate solution; and compensating the second user for the first candidate solution based on the improvement value provided by the first candidate solution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8A is a diagram of an example problem information data structure that may be used by the exchange service to store the problem information associated with each problem submitted to the exchange service.

FIG. 8B is a diagram of an example candidate solution information data structure that may be used by the exchange service to store information associated candidate solutions submitted for black-box optimizations problems.

FIG. 9 is a diagram of an example user interface for displaying information for black-box optimization problems that have been submitted to the exchange service.

FIG. 10 is a diagram of an example user interface for displaying details of a black-box optimization problem that has been submitted to the exchange service.

FIG. 11 is a diagram of another example user interface for displaying details of a black-box optimization problem that has been submitted to the exchange service.

DETAILED DESCRIPTION

Figure 1:
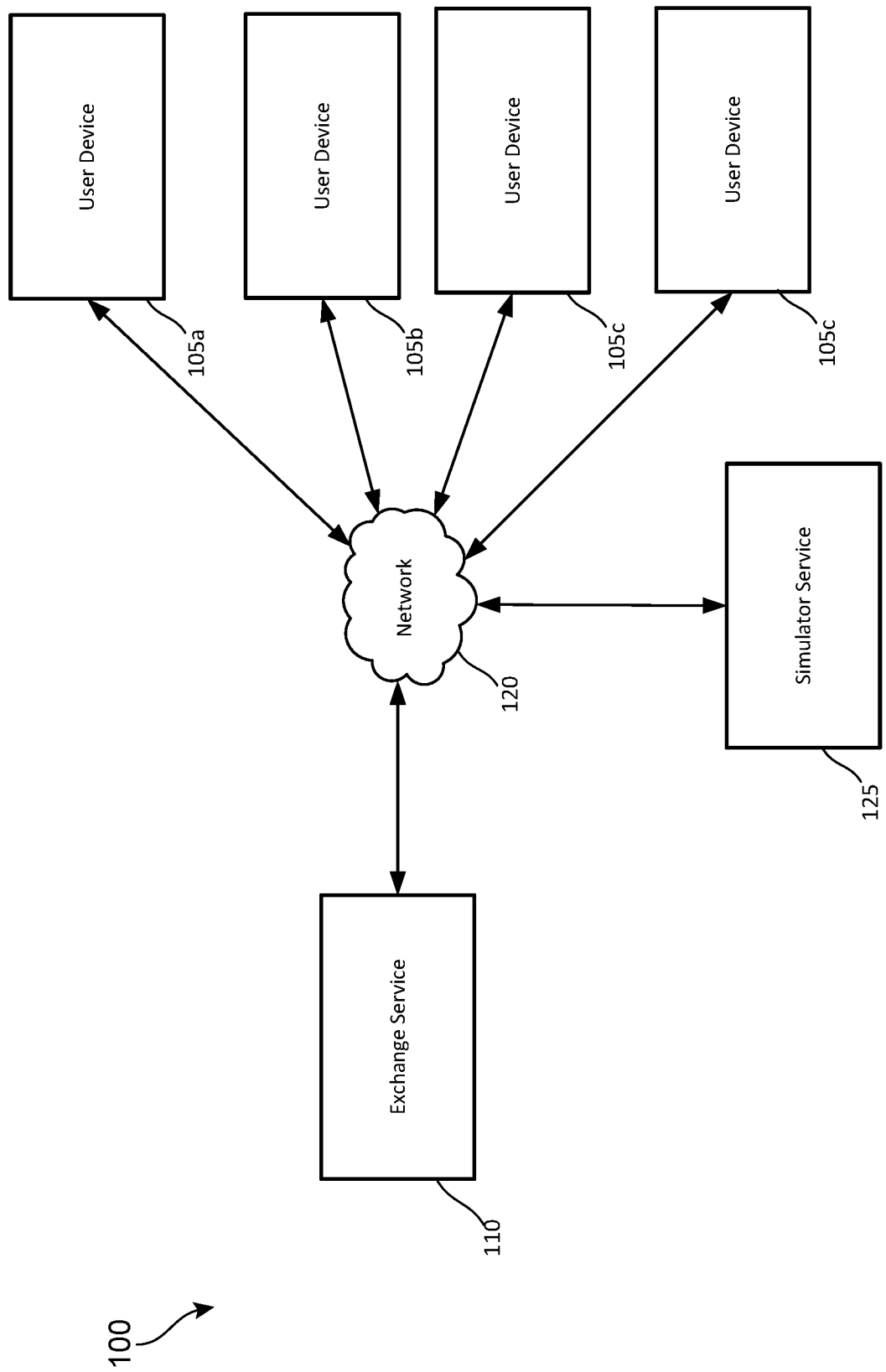
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are described herein for providing an exchange service for obtaining solutions to black-box optimization problems. These techniques provide a technical solution for obtaining solutions to black-box optimization problems by providing an online regulated competitive platform on which users seeking to optimize a black-box optimization problem may submit the problem for presentation to other users of the exchange service who may submit candidate solutions that may optimize the objective function associated with the submitted black-box optimization problem. The optimization may include minimizing or maximizing an objective value output by the objective function. Whether the objective value is to be minimized or maximized depends on the black-box optimization problem. Furthermore, the objective value may be bounded by an upper bound or lower bound value depending upon the black-box optimization problem and the candidate solution vectors may also be bounded by upper and lower bound vectors and/or may have additional constraints.

The exchange service automatically submits a candidate solution to a simulator service configured to execute the objective function associated with the black-box optimization problem with the candidate solution as an input to the objective function. The simulator service provides the objective value resulting from the execution of the objective function to the exchange service. The exchange service may analyze the objective value associated with the candidate solution to determine whether the candidate solution provided an improvement in the objective value. The exchange service may then award a reward to the user account of the user who submitted the candidate solution that provided the improvement in the objective value based on a reward function or reward schedule provided by the user who submitted the problem. The exchange service may automatically analyze the objective value obtained for a candidate solution to determine the reward to be awarded to the user who submitted the candidate solution and automatically transfer the reward from the user account of the user who submitted the problem to the user who submitted the candidate solution. The exchange service may support multiple black-box optimization problems simultaneously and submissions of candidate solutions to these problems simultaneously. The exchange service provides transparency to users of the exchange service. Registered users may view the black-box optimization problems submitted, the candidate solutions submitted for those problems, and the objective values obtained by submitting those candidate solutions to the simulator service. The rewards that may be earned may also be published with the candidate solutions associated with a respective black-box optimization problem to encourage other users to submit candidate results for consideration. The collaborative and competitive approach to black-box optimization provided by the exchange service may provide a more efficient and faster approach to maximizing the objective function associated with the black-box optimization problem. Users submitting candidate solutions may work in parallel and utilize various technical approaches for determining the candidate solutions. As a result, the user submitting the black-box optimization problem may obtain numerous candidate solutions from other users that the user submitting the optimization problem may not have otherwise determined or determined within a reasonable amount of time. This collaborative approach can significantly reduce computing, network, and/or memory resources utilized to maximizing the objective function associated with the black-box optimization problem. These and other technical benefits of the techniques disclosed herein will be evident from the discussion of the example implementations that follow.

The exchange service may include two types of users: problem submitters and solutions submitters. The problem submitters include people, entities, corporations, organizations, or their representatives who seek to solve optimization problems. The first type of users may submit these black-box optimization problems to the exchange service. The objective functions associated with the black-box optimization problems may related to complex problems, such as but not limited to energy production and/or distribution, routing and/or scheduling for transportation and/or shipping, supply-chain management, risk management and finance, genome search and design, engineering design of materials, structures, hardware or software, and/or other such scenarios involving complex problems. The problem submitters may be seeking to optimize an objective function to increase economic, technologic, and/or scientific value in a particular domain. The problem submitters may be willing to pay financial rewards for candidate solutions that provide improvements in the respective objective functions associated with the black-box optimization problems submitted by the problem submitters. The problem submitters may utilize the exchange service due to the (i) easy to use user interface with plug and play capabilities provided by the exchange service, (ii) the effectiveness of the ensemble-based optimization platform provided by the exchange service, (iii) guaranteed pay-per-improvement costs, and (iv) intellectual property (IP) protection provided by the exchange service. The exchange service provides an easy-to-use user interface that may guide a problem submitter through submitting a new black-box optimization problem. The collaborative and game-theoretic of the exchange service also provides significant improvements for problem submitters who do not need to invest resources to develop multiple approaches for maximizing the objective value. The exchange service also provides clear costs for achieving specific improvements. The exchange service also provides protection of the IP of the problem submitters. The exchange service may operate with a simulator service, as discussed in the example implementations which follow. The simulator service may be implemented by the problem submitter to securely execute the respective objective function associated with their black-box optimization problem without disclosing sensitive IP to the exchange service or the other users providing candidate solutions. The simulator service may also provide means for securely receiving the objective function from the problem submitter and executing the objective function on candidate solutions submitted for the black-box optimization problem associated with the objective function.

The solutions submitters including individuals, entities or their representative computer algorithms that seek financial rewards in return for performing machine learning and search computations that improve the objective functions of problem submitters. The exchange service provides a platform for connecting the problem submitters with solutions submitters and provides a real-time exchange where the solution submitters can select from black-box optimization problems. Additional details of the exchange service, the interaction of the users, and the technical benefits provided by the exchange service will be discussed in detail in the examples which follow.

FIG. 1 is a diagram showing an example computing environment 100 in which the techniques disclosed herein for obtaining solutions to black-box optimization problems may be implemented. The computing environment 100 may include an exchange service 110. The example computing environment 100 may also include computing devices, such as the computing devices 105a, 105b, 105c, and 105d, and a simulator service 125. The computing devices 105a, 105b, 105c, and 105d may communicate with the exchange service 110 and/or the simulator service 125 via the network 120. The simulator service 125 may also communicate with the exchange service 110 via the network 120. The network 120 may include one or more wired and/or wireless public networks, private networks, or a combination thereof. The network 120 may be implemented at least in part by the Internet.

The computing devices 105a, 105b, 105c, and 105d are each a computing device that may be used to communicate with the exchange service 110 and/or the simulator service 125. The computing devices 105a, 105b, 105c, and 105d may include a native application associated with the exchange service 110 that provides a means for the user to access the services provided by the exchange service 110, including posting black-box problems for which an optimized solution is being sought, viewing problems that have been submitted to the computing device, submitting candidate solutions to a black-box problem, browsing black-box problems that have been submitted to the exchange service 110, and viewing results and/or rewards associated with a particular candidate solution that has been submitted to the exchange service 110 for a black-box problem. The computing devices 105a, 105b, 105c, and 105d may alternatively access the services provided by the exchange service 110 via a web browser or browser-enabled application and the exchange service 110 may be implemented as a web-based application accessible via the network 120.

The computing devices 105a, 105b, 105c, and 105d may be implemented by computing devices having various types of form factors. The computing devices 105a, 105b, 105c, and 105d may be implemented as a desktop computer, a laptop computer, a tablet computer, a smartphone, and/or other type of computing device. While the example implementation illustrated in FIG. 1 includes four computing devices, other implementations may include a different number of computing devices. Furthermore, the exchange service 110 may be used by combinations of different types of computing devices.

Figure 2:
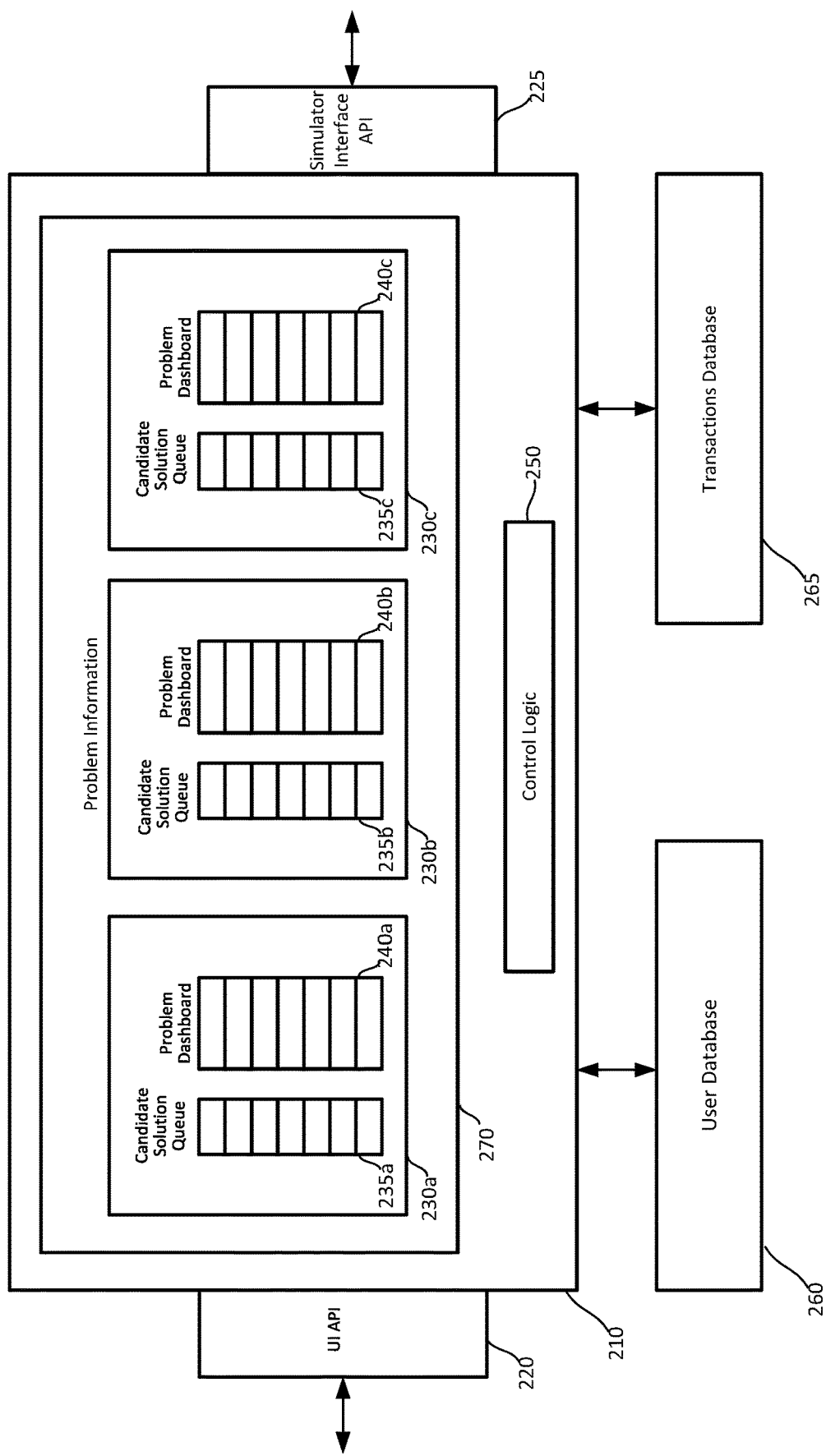
FIG. 2 is an example architecture that may be used, at least in part, to implement the exchange service shown in FIG. 1.

The exchange service 110 is configured to provide an online virtual exchange for obtaining solutions to black-box optimization problems. The exchange service 110 provides means for users to post black-box problems for which an optimized solution is being sought, viewing problems that have been submitted to the computing device, submit candidate solutions to a black-box problem, and view results and/or rewards associated with a particular candidate solution that has been submitted to the exchange service 110 for a black-box problem. Some functionality may be limited to specific users or specific types of users. For example, the user that submits a black-box optimization problem may have access to functionality to modify the problem description, remove a black-box problem that has been submitted, close the submission of candidate solutions for a black-box problem, and/or other features related to managing a submitted black-box optimization problem. FIG. 2 is a diagram that shows an example implementation of the exchange service 110 that shows additional features of the exchange service 110. FIGS. 3 and 4A-4I are diagrams that show examples of the exchange service 110 processing a black-box optimization problem and candidate solutions to the black-box optimization problem. FIGS. 9-11 show examples of some of the types of graphical user interfaces that the exchange service 110 may provide for interacting with the services provided by the exchange service 110. Each of these example implementations are described in greater detail in the sections which follow. The exchange service 110 may also be configured to provide registration functionality that allows users to register with the service, account management functionality for managing accounts of users, and authentication functionality for authenticating users who access the exchange service 110.

The simulator service 125 may be configured to receive candidate solutions submitted to the exchange service 110, to execute the objective function using a candidate solution submitted by a user, and to provide the results of the simulation to the exchange service 110. A candidate solution may include a vector of values that represent an input to the objective function associated with the black-box problem to be optimized. The simulator service 125 may return a result pair that includes the candidate solution and the objective value determined for the candidate solution. FIG. 1 shows an example implementation with a single simulator service 125. However, other implementation may include multiple simulator services 125. Some implementations may include an instance of the simulator service 125 for each black-box optimization problem that is submitted to the exchange service 110. The problem submitter may implement an instance of the simulator service 125 to execute the objective function associated with their submitted black-box optimization problem. The simulator service 125 may be implemented with a standard application programming interface (API) that facilitates communication between the exchange service 110 and instance of the simulator service 125. The simulator service 125 may be configured receive a candidate solution from the exchange service 110 and to provide the objective value associated with the results of executing the objective function with the candidate solution as an input. The exchange service 110 is configured to receive and display the processed candidate solutions and the associated objective values to users of the exchange service 110 as will be discussed in detail in the examples which follow.

A technical benefit of the simulator service 125 instances being implemented by the problem submitters is that the problem submitters do not need to disclose the objective function associated with the black-box optimization problem and disclose potentially sensitive IP assets to obtain candidate solutions. However, in some instances, the problem submitters may not have the capability or the desire to set up, maintain, and operate a simulator service 125 for the black-box optimization problems that they submit to the exchange service 110. Instead, a version of the simulator service 125 may be implemented by the exchange service 110 that allows the problem submitters to securely provide the objective function associated with the black-box optimization problem that they have submitted to the exchange service 110. Such implementations of the simulator service 125 may securely execute the objective function on candidate solutions provided by solution providers to object the objective values associated with those candidate solutions. The exchange service 110 may also provide means for the user to define the black-box optimization problem and the exchange service 110 may be configured to communicate with the simulator service 125 to set up the simulation parameters for testing candidate solutions. Additional details of the simulator service 125 are provided in the examples which follow.

FIG. 2 is an example architecture that may be used, at least in part, to implement the exchange service 110 shown in FIG. 1. FIG. 210 shows an example exchange service 210 that may implement the exchange service 110 shown in FIG. 1. The exchange service 210 may include a user interface (UI) API 220, a user database 260, a transactions database 265, and a simulator interface API 225. The exchange service 210 may also include control logic 250 and problem information 270.

The control logic 250 may comprise machine-executable program code that causes a processor or processors of a data processing system on which the exchange service 210 is implemented to perform various operations to support the services provided by the exchange service 210. The problem information 270 includes information associated with black-box optimization problems that have been submitted to the exchange service 210. The problem information 270 may be stored in the transactions database 265 and loaded into memory of the data processing system on which the exchange service 210 is implemented. In the example shown in FIG. 2, three problems have been submitted to the exchange service 110, and the problem information 270 includes problem information 230*a*, 230*b*, and 230*c* for the three problems that have been submitted to the exchange service 110. Problem information 230*a* includes a candidate solution queue 235*a* and a problem dashboard 240*a*. Problem information 230*b* includes a candidate solution queue 235*b* and problem dashboard 240*b*. Problem information 230*c* includes a candidate solution queue 235*c* and a problem dashboard 240*c*.

The candidate solution queue 230 may be implemented as a first-in first-out (FIFO) queue in which candidate solutions provided by one or more solution submitter users of the exchange service 210 are inserted into the queue in the order that they are received by the exchange service 210. Once the candidate solutions have been added to the candidate solution queue, the simulator service 125 may request one or more of the candidate solutions from the candidate solution queue 230 for processing. For each candidate solution received by the simulator service 125, the simulator service 125 may execute the objective function associated with the black-box optimization problem using the respective candidate solution as an input to the objective function. The simulator service 125 may then return the candidate solution and the objective value obtained by running the simulation on the candidate solution to the exchange service 110. The exchange service 110 may then add the processed candidate solution and associated objective value determined by the simulator service 125 to the problem dashboard 240. The problem dashboard 240 is a list of candidate solutions and corresponding objective values resulting from the processing of the corresponding candidate solution with the objective function associated with the problem.

FIG. 8A is a diagram of an example problem information data structure 805 that may be used by the exchange service 210 to store the problem information associated with each problem submitted to the exchange service 210. The problem information data structure 805 includes a problem identifier field 810, a problem start time field 815, a problem end time field 815, and a problem description field 825. The problem identifier field 810 may be used to store a unique identifier associated with each problem submitted to the exchange service 210. The problem identifier may be automatically generated and assigned to a problem by the exchange service 210 responsive to the problem being submitted to the exchange service 210. The problem start time field 815 may include a start day and time for which the exchange service 210 may present the problem on the virtual exchange for receiving candidate solutions from another user. The identifier may also include a problem end time field 820. The user submitting the problem may specify a day and time at which to close the submission of candidate solutions from the other users. In some implementations, the user interface for submitting a problem to the exchange service 210 and/or for modifying problem information associated with problems that have already been submitted to the exchange service 210 may be configured to permit the user to specify the date and time at which the submission of candidate solutions is to be closed by the exchange service 210. The data structure 805 may also include a problem description field 825 to store a description of the problem. The description of the problem may be provided by the user submitting the black-box optimization problem to describe the black-box optimization problem to be optimized so that other users may assess whether they may wish to submit candidate solutions that may improve the objective value of the objective function associated with the black-box optimization problem. The description may also describe the format for the candidate solutions to be provided by the other users and the reward schedule providing a description of the rewards provided to users submitting candidate solutions and the criteria for earning the rewards described on the reward schedule.

FIG. 8B is a diagram of an example candidate solution information data structure 875 that may be used by the exchange service 210. The candidate solution information data structure 875 may include a problem identifier field 810, a candidate solution identifier field 830, a candidate solution result value field 835, a candidate solution received field 840, a candidate solution result field 845, a candidate solution reward field 850, and a candidate solution result determined field 855. The problem identifier field 810 is the identifier of problem for which the candidate solution identified in the candidate solution identifier field 830 has been submitted. The problem identifier field 810 of the candidate solution information data structure 875 is identical to that of the problem information data structure 805 discussed above. The candidate solution identifier 830 is a unique identifier associated with the candidate solution. The candidate solution identifier 830 may be unique with respect to the candidate solutions associated with the problem or overall, with respect to the candidate solutions that have been submitted to the exchange service 210.

The value stored in the candidate solution result value field 835 represents a candidate solution that has been submitted by a user in response the black-box optimization problem identified in problem identifier field 810. The candidate solution result value 835 may include various types of data. The type of data of the candidate solution depends upon expected input for the objective function associated with the black-box optimization problem for which the candidate solution has bene provided. In the example shown in FIG. 8B, the candidate solution result value is a vector of numeric values, but other implementations may have other types of input values. In some implementations, the candidate solution result value may be stored externally from the candidate solution result value field, and the candidate solution result value make be a pointer or address to a memory location where the candidate solution may be obtained. This approach may be appropriate for complex and/or large candidate solution result values that may not be suitable for storing in a candidate solution result value field 835.

The candidate solution result 845 stores a value of the results obtained from the simulator service 125. The candidate solution result determined field 855 indicates when the candidate solution result 845 was determined by the simulator service 125. The candidate solution reward 850 indicate a reward that was awarded to the candidate solution (if any) based on the candidate solution result 845 and the reward criteria included in the reward schedule associated with the black-box optimization problem.

The UI API 220 may be configured to provide an interface between graphical user interfaces associated with the virtual exchange and the exchange service 210. Some examples of types of graphical user interfaces that may be associated with the virtual exchange are shown in FIGS. 9-12. The user interfaces may, in some implementations, be provided by a native application that has been installed on the user device 105 of a user, and the native application may communicate with the exchange service 210 via the UI API 220. The exchange service 210 may also provide a web-based application front-end that may be accessed by a browser application on the user device 105 of a user. In such implementations, the web-based front end may communicate with the exchange service 210 via the UI API 220. The UI API 220 may provide information to the native application and/or web-based application interface that may be presented to users via the graphical user interfaces shown in FIGS. 9-12. Furthermore, the UI API 220 may also be configured to receive user inputs received via the graphical user interface via the native application or browser application on the user device 105 and provide the user inputs to the control logic 250 of the exchange service 210 for processing.

The UI API 220 may implement message receptors configured to receive incoming messages from the native application or browser application on the user devices and/or from the web-front end. UI API 220 may perform user authentication and validation on the messages before providing the messages to the control logic 250 for processing. The UI API 220 may implement the message receptors as Transmission Control Protocol/Internet Protocol (TCP/IP) receptors and/or receptors that implementation other such communications protocols.

The control logic 250 may then process the received messages based on the type of message received. A native application on the user device 105 of a user or the web-based front end may send messages to the exchange service 210 requesting that the exchange service 210 perform various actions including a create new problem message for submitting a new black-box optimization problem, a modify problem message for modifying a previously-submitted black-box optimization problem, a submit candidate solution message for providing a candidate solution for consideration, and a process candidate solution message for requesting that one or more candidate solutions provided by other users be processed by the simulator service 125. The UI API 220 may be configured to receive these and other messages and to provide instructions and/or data associated with the messages to the control logic 250 for processing.

The simulator interface API 225 is configured to provide an interface that facilitates exchanging of messages between the exchange service 210 and the simulator service 125. The simulator interface API 225 may provide means for the exchange service 210 to send requests to the simulator service 125 to run simulations of a black-box problem with a candidate solution provided by a user. The candidate solution may be obtained from the problem queue 235 and sent to the simulator service 125 for processing via the simulator interface API 225. The simulator interface API 225 may also be configured to receive each processed candidate solution and corresponding objective value to the exchange service 210 from the simulator service 125. The simulator interface API 225 may implement the message receptors as Transmission Control Protocol/Internet Protocol (TCP/IP) receptors and/or receptors that implementation other such communications protocols.

The user database 260 may include user information records for each of the users that are registered with the exchange service 210. The user information records may include contact information for the user, authentication credentials for the user, payment information for paying rewards, and account information for receiving monetary rewards for submitting candidate solutions that meet the criteria for receiving a reward for a particular problem. The exchange service 110 may be configured to provide registration functionality that enables users to register with the service, account management functionality for managing accounts of users, and authentication functionality for authenticating users who access the exchange service 110. User may problem submitters, solution submitters, or both.

The transactions database 265 may be used to store the problem information and candidate solution information, such as that shown in FIGS. 8A and 8B may be stored in the transactions database 265. The transactions database 265 may also include payment information associated with rewards that have awarded to users who have submitted candidate solutions that have met the award criteria associated with a black-box optimization problem. The transactions database 265 may also include payments associated with the cost for processing candidate solutions, which is charged to the account of the user who submitted the candidate solution. As will be discussed in the examples which follow, the users submitting candidate solutions are charged at least a nominal fee when a candidate solution that the user has submitted is processed by the simulator service 125. The user database 260 or the transactions database 265 may maintain account balance information associated with each user. The account balance information may represent an amount of funds that the user has available for awarding rewards to other users who have submitted candidate solutions for a black-box optimization problem submitted by the user or for submitting candidate solutions for black-box optimization problems submitted by other users. The account balance may also represent funds that have been awarded to the user for submitting one or more candidate solutions that met the reward criteria associated with the black-box optimization problem for which the rewards were received.

Figure 3:
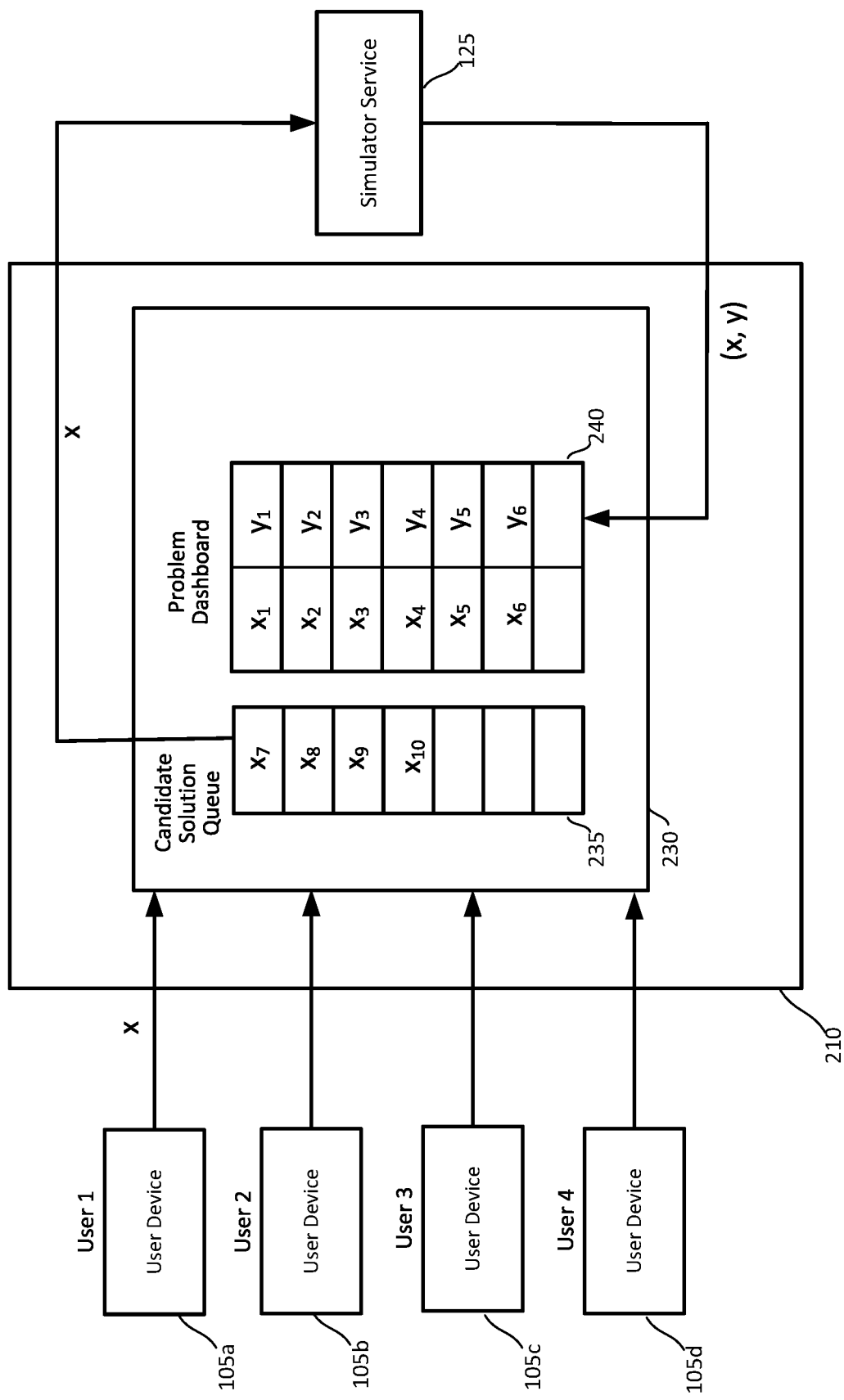
FIG. 3 is a diagram of a representation of a problem and the candidate solution queue and problem dashboard associated with the problem which may be implemented by the exchange service shown in FIG. 2.

FIG. 3 is a diagram of a representation of a problem and the candidate solution queue and problem dashboard associated with the problem which may be implemented by the exchange service shown in FIG. 2. FIG. 3 shows how data may be exchanged between the user devices 105a, 105b, 105c, and 105d, the exchange service 110, and the simulator service 125. In the example shown in FIG. 3, a user of user device 105d has submitted a black-box optimization problem to the exchange service 110. The exchange service 110 may provide a user interface for submitting a new black-box optimization problem, such as the user interface 1205 shown in FIG. 12. The user interface 1205 may guide the user through providing a description of the black-box optimization problem, defining the expected format of the candidate solutions to be provided by other users, and defining rewards and the criteria for earning the rewards. The user may activate the cancel button 1215 to cancel the submission of the new black-box optimization problem or activate the submit button 1210 to cause a create new problem message to be provided to the exchange service 110. The exchange service 110 creates a new problem instance 230 that includes a candidate solution queue 235 and a problem dashboard 240. FIG. 3 shows an example of the stage of the exchange service 110 after the black-box optimization problem has been created and presented on the virtual exchange. Once a black-box optimization problem has been submitted, the exchange service 110 may present the black-box optimization problem to other users of the exchange service 110 as shown in FIGS. 10 and 11.

The user of user device 105a in this example submits a candidate solution x to the exchange service 110. The user device 105a may send a submit candidate solution message to the exchange service 110 that includes the candidate solution, and the exchange service 110 may insert the candidate solution into the candidate solution queue 235.

In some implementations, the simulator service 125 may automatically request one or more candidate solutions from the candidate solution queue 235 responsive to the simulator service 125 have available computational resources for processing the one or more candidate solutions requested. The simulator service 125 may send a request for candidate solutions message to the exchange service 110 to provide candidate solutions associated with specific black-box optimization problem. In some implementations, the user who submitted the black-box optimization problem may request, via their user device 105, that one or more candidate solutions from the candidate solution queue 235 for processing by the simulator service 125 instead of or in addition to the simulator service automatically requesting the candidate solutions from the exchange service 110.

FIGS. 4A-4I are diagrams that show an example of the exchange service 110 processing a series of candidate solutions that have been submitted for a block-box optimization problem. Three users contribute to the examples shown in FIGS. 4A-4I. User 1 is associated with user device 105a, User 2 is associated with user device 105b, and User 3 is associated with user device 105c. User 1, User 2, and User 3 each submit candidate solutions for the black-box optimization problem to the exchange service 110.

Figure 4A:
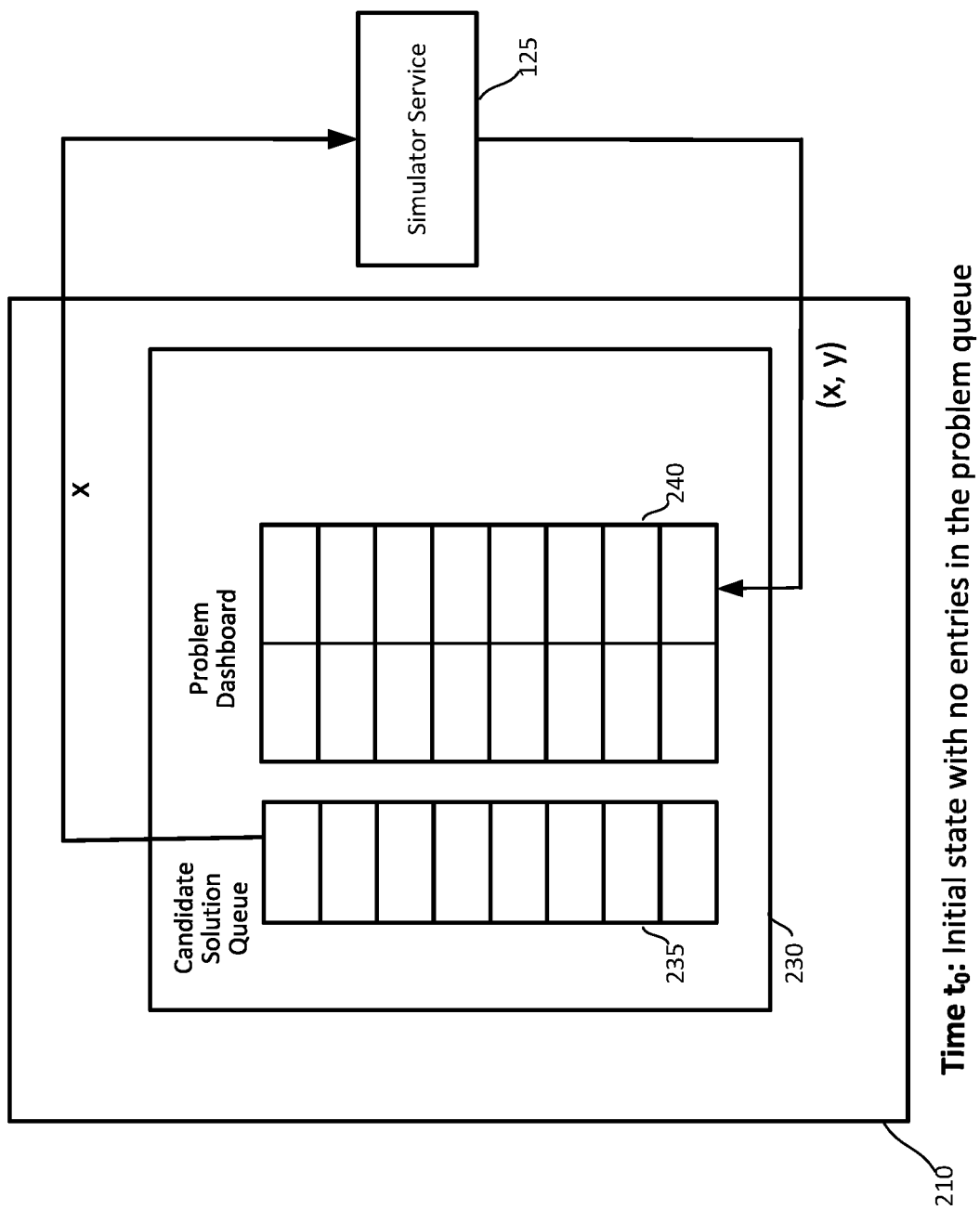
FIGS. 4A-4I are diagrams showing the processing of candidate solutions to a problem by the exchange service shown in the preceding figures.

FIG. 4A is a diagram showing the state of the problem information instance 230 associated with the black-box optimization problem at a first time to. The candidate solution queue 235 and the problem dashboard 240 are initially empty. Each of the users also have an initial user account balance of $100.

Figure 4B:
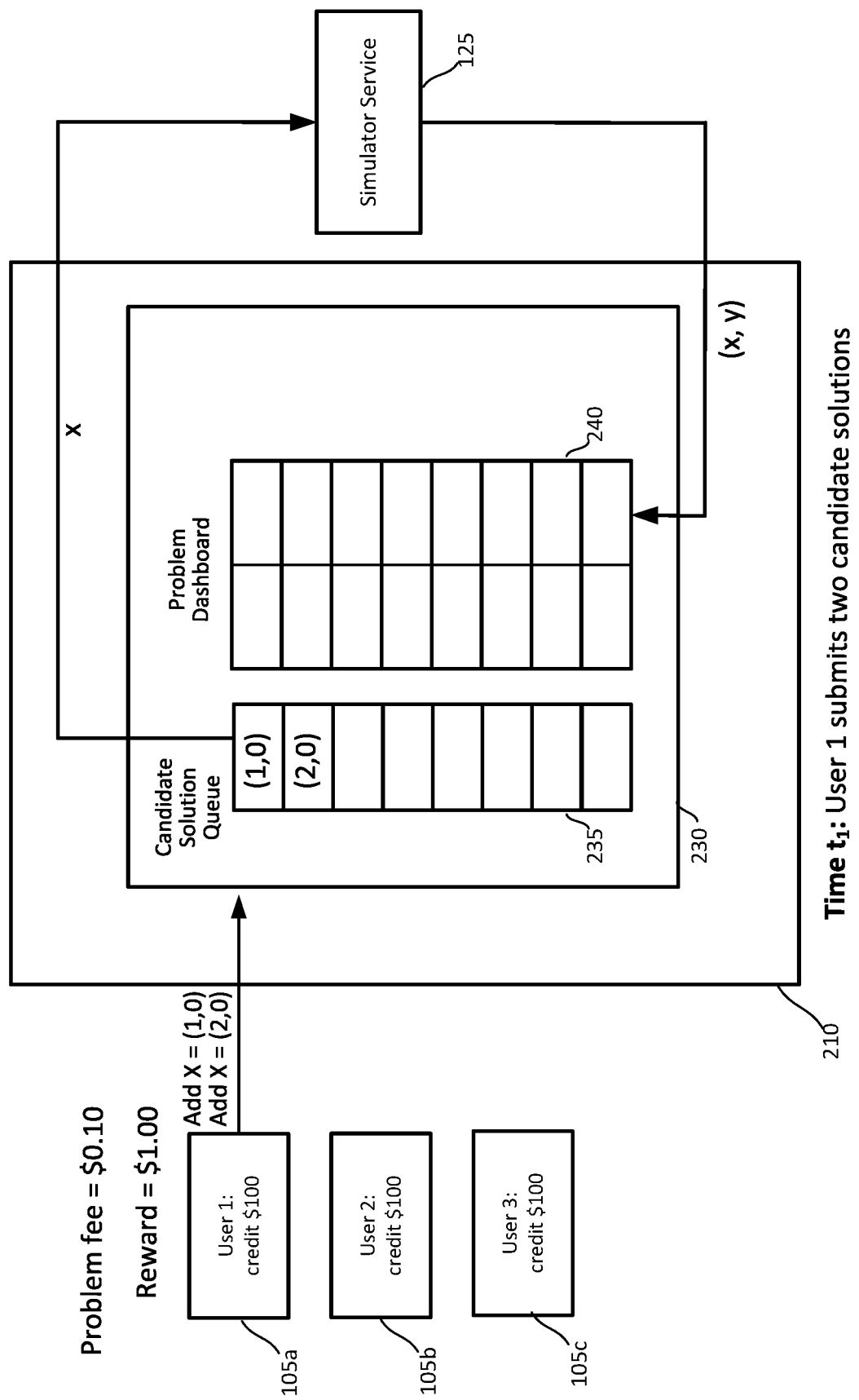

FIG. 4B is a diagram showing the state of the problem information instance 230 associated with the black-box optimization problem at a second time $t_1$. At the second time, User 1 submits two candidate solutions via the user device 105a. The user device 105a may send a submit candidate solution message to the exchange service 210 for each of the candidate solutions being submitted. The exchange service 210 receives the candidate solutions and inserts the candidate solutions into the candidate solution queue 235. The candidate solution queue 235 now has two entries. The problem dashboard 240 remains empty because no candidate solutions have yet been provided to the simulator service 125 for processing.

Figure 4C:
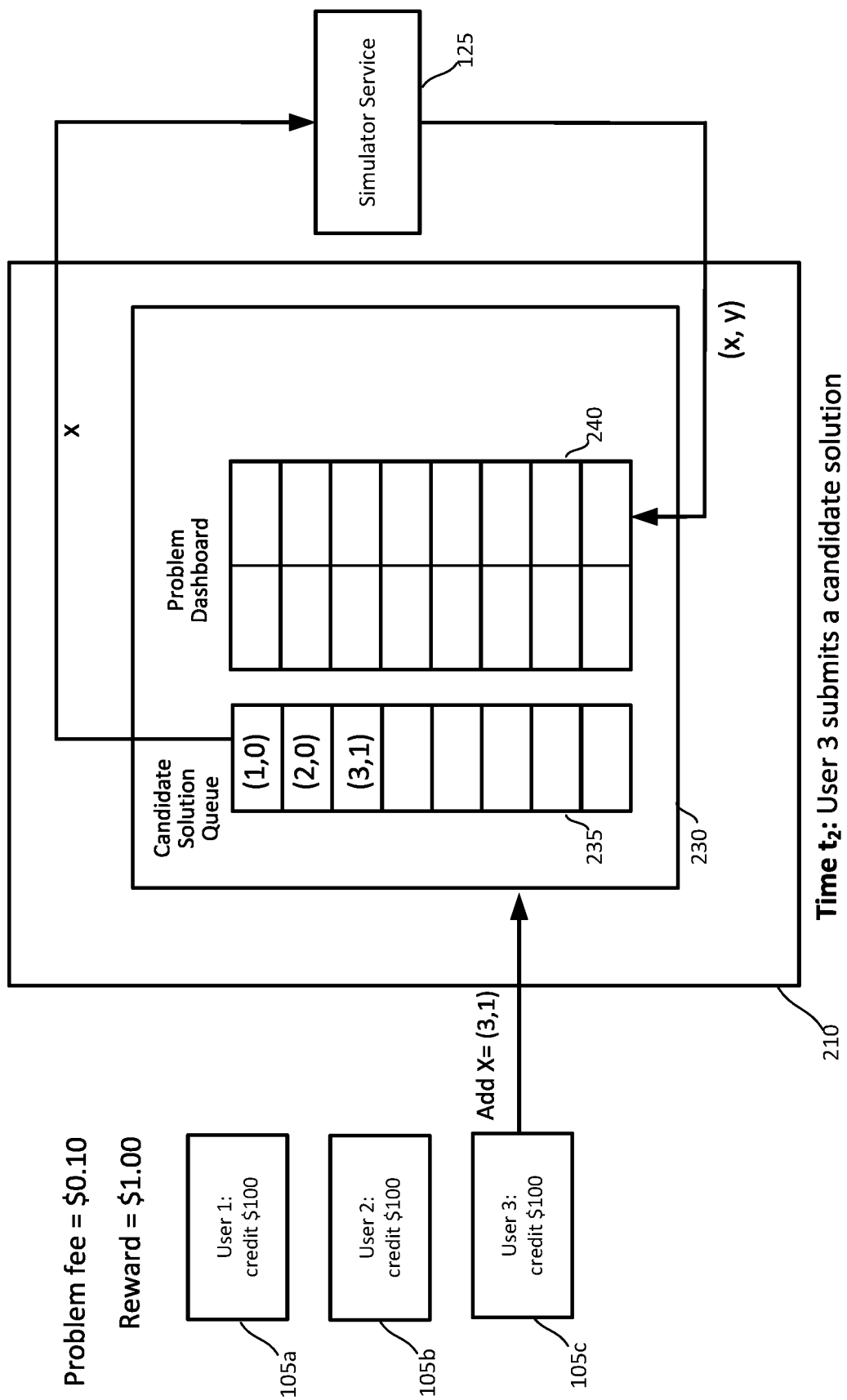

FIG. 4C is a diagram showing the state of the problem information instance 230 associated with the black-box optimization problem at a third time $t_2$. At the third time, User 3 submits one candidate solution using their user device 105c. The user device 105c may send a submit candidate solution message to the exchange service 210 for each of the candidate solutions being submitted. The candidate solution queue 235 now has three entries.

Figure 4D:
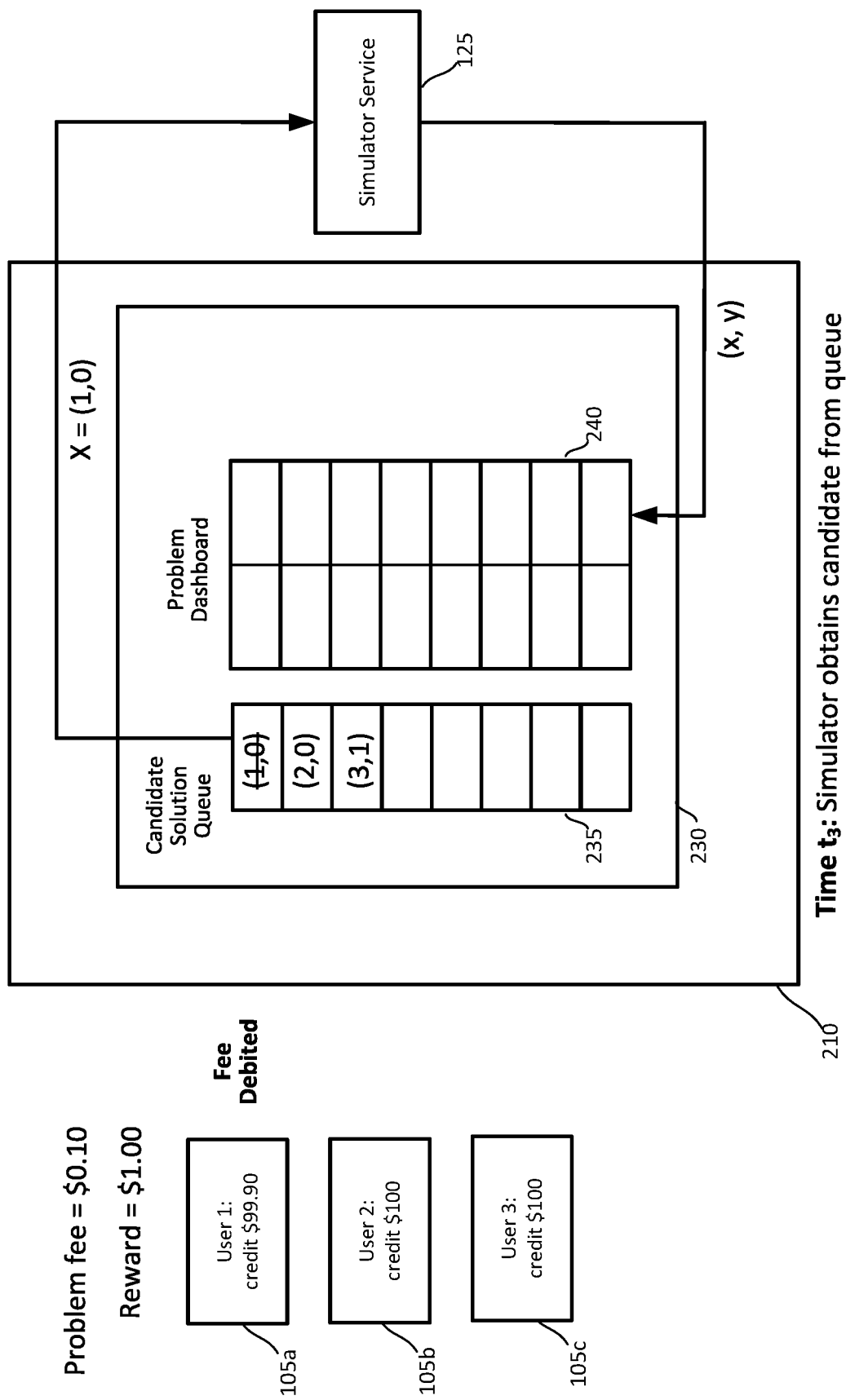

FIG. 4D is a diagram showing the state of the problem information instance 230 associated with the black-box optimization problem at a fourth time $t_3$. At the fourth time, the simulator service 125 requests a single candidate solution associated with the black-box problem from the exchange service 210. As discussed above, the simulator service 125 may be implemented by the problem submitter or be a third-party secure service that is configured to security receive and execute the objective function from the problem submitter. The request from the simulator service may include the problem identifier associated with the problem for which the candidate solution has been requested. The simulator service Responsive to the request from the simulator service 125, the exchange services 210 sends the first entry from the candidate solution queue 235 to the simulator service 125 and removes the first entry from the candidate solution queue 235. The exchange service 210 also debits the problem submission fee from the user account of User 1. In this example, the problem submission fee is $0.10, but the cost to submit a problem may be different in other implementations. In some implementations, the exchange service 210 may implement a flat fee for submission of candidate solutions for all problems. In other implementations, the problem submission fee may be set to different values for different problems. The user submitting the candidate solution may configure the problem submission fee in some implementations. However, the exchange service 210 may set an upper limit and/or lower limit on the problem submission fee. The problem submission fee may not be debited from the user account of the user submitting the candidate solution until the candidate solution is provided to the simulator service 125 for processing. Two entries remain in the candidate solution queue 235 after the first entry is removed from the candidate solution queue 235.

Figure 4E:
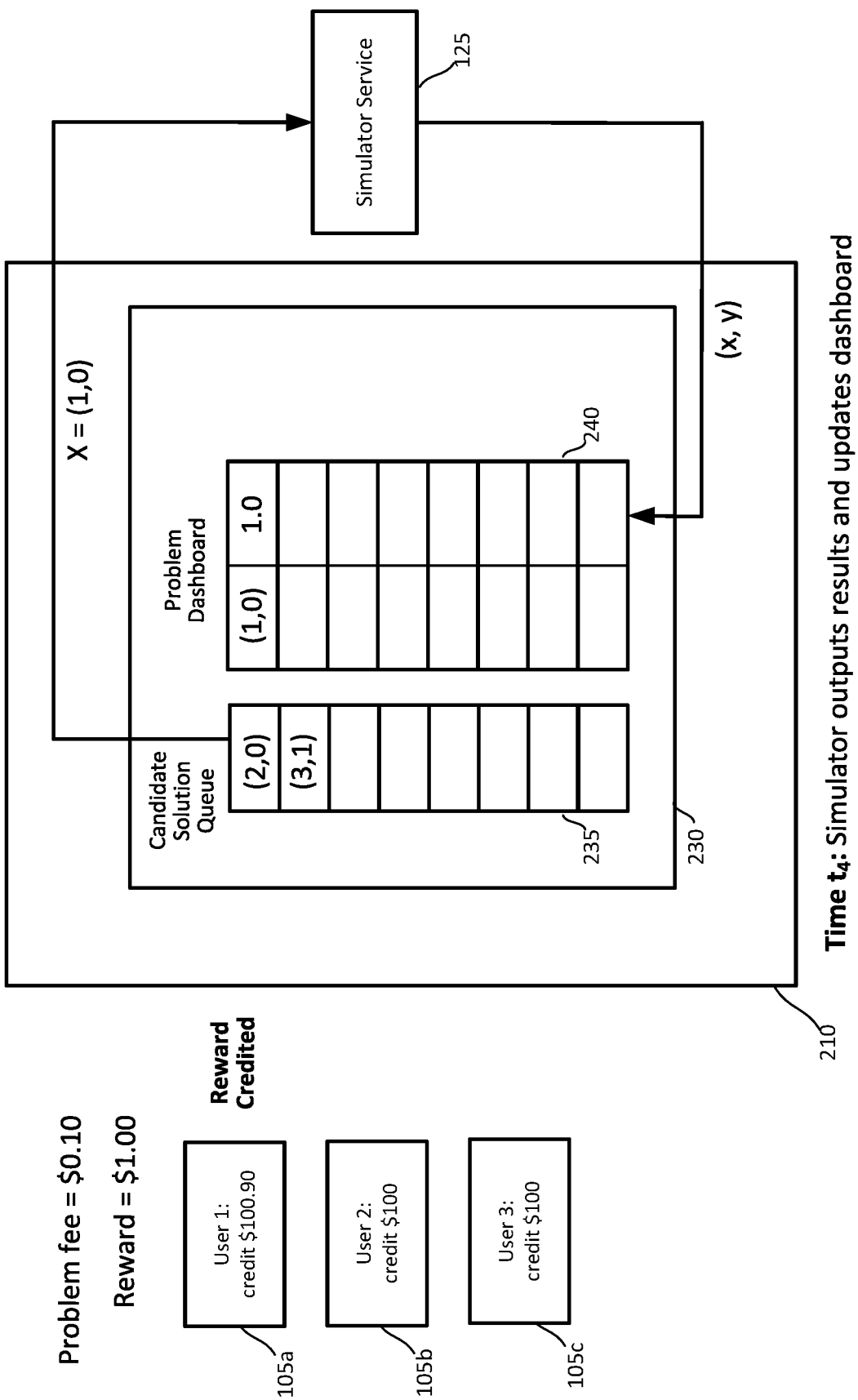

FIG. 4E is a diagram showing the state of the problem information instance 230 associated with the black-box optimization problem at a fifth time $t_4$. At the fifth time, the simulator service 125 determines the candidate solution result (y) (also referred to as the "objective value") determined for the objective function associated with the black-box optimization problem where the candidate solution (x) was provided as an input. The simulator service 125 provides the candidate solution and the candidate solution result to the exchange service 210. The simulator service 125 may send a candidate solution results message to the exchange service 210 that includes the candidate solution and the candidate solution result. The exchange service 210 updates the problem dashboard 240 to include the candidate solutions (left column) and the candidate solution result associated with the candidate solution (right column). The exchange service 210 also determines whether the candidate solution should be awarded a reward based on the candidate solution result obtained based on the candidate solution. The exchange service 210 may execute a reward function to determine the candidate solution should be awarded a reward and how much the reward should be. In the example shown in FIG. 4E, the candidate solution has earned a $1.00 reward. The reward is credited to the user account of User 1. Rewards may be debited from an account associated with the simulator service 125, and the reward may be funded by the submitter of the black-box optimization problem.

Figure 4F:
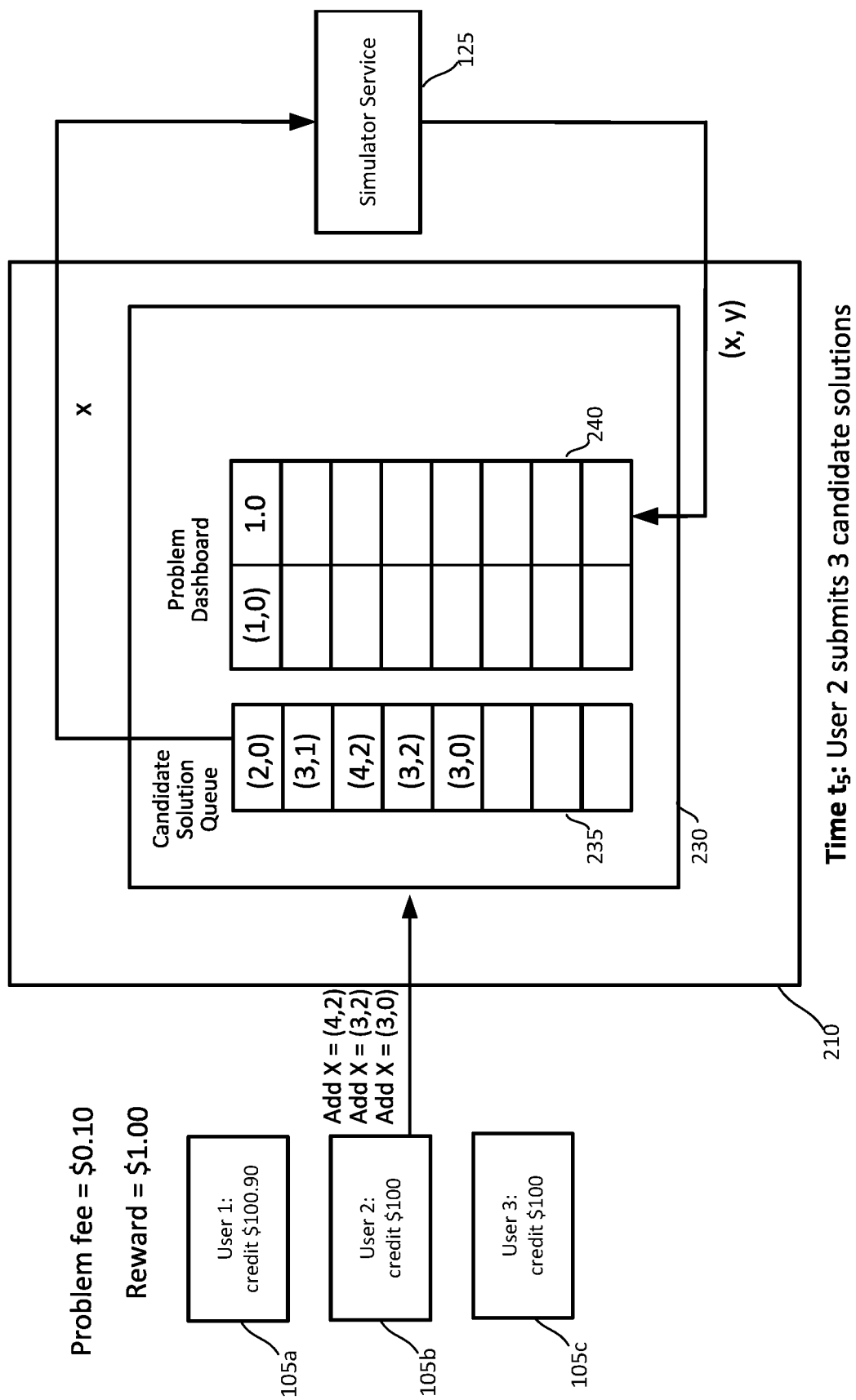

FIG. 4F is a diagram showing the state of the problem information instance 230 associated with the black-box optimization problem at a sixth time $t_5$. At the sixth time, User 2 submits three candidate solutions using their user device 105b. The user device 105b may send a submit candidate solution message to the exchange service 210 for each of the candidate solutions being submitted. The candidate solution queue 235 now has five entries. The problem submission fee is not charged to the user account of User 2 at this time, because the candidate solutions have not yet been processed by the simulator service 125.

Figure 4G:
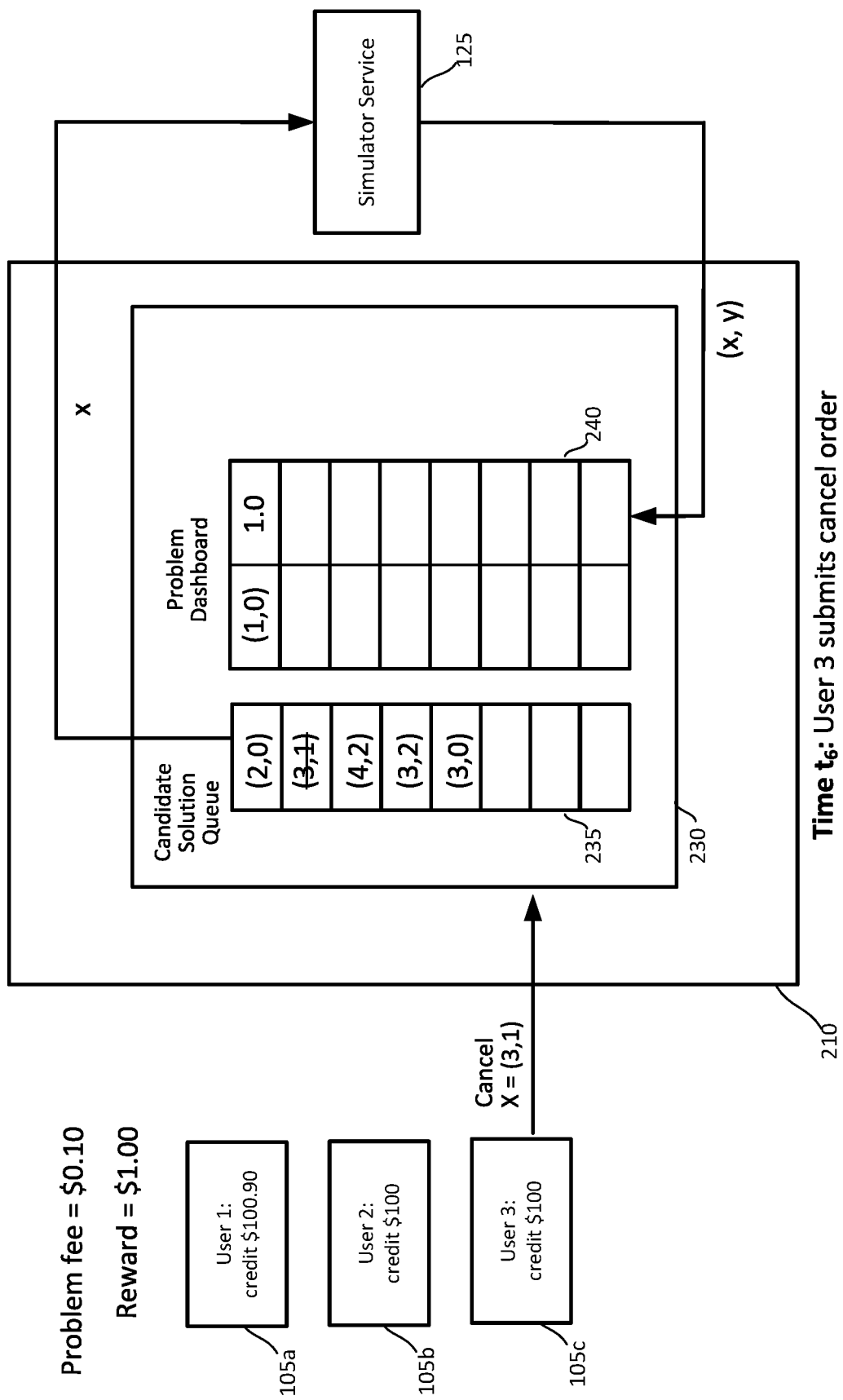

FIG. 4G is a diagram showing the state of the problem information instance 230 associated with the black-box optimization problem at a seventh time $t_6$. At the seventh time, User 3 submits a cancel candidate solution request to the exchange service 210 to cancel the candidate submission (3,1). The exchange service 210 determines that the candidate solution is still in the candidate solution queue 225 and removes the candidate solution from the candidate solution queue 235. The exchange service 210 may permit candidate solutions that have not yet been processed by the simulator service 125 to be canceled by the user submitting the candidate solution. The user may wish to cancel a submitted candidate solution in view of the results posted in the problem dashboard 240, to modify the candidate solution, and/or for other reasons. The exchange service 210 may provide a cancel user interface option, such as the cancel user interface button 1015 shown in FIG. 10 that may cause a user interface to be presented that allows the user to select one or more candidate solutions submitted by the user to be canceled. Four candidate solutions remain in the candidate solution queue 235 after the cancelation of the candidate solution shown in FIG. 4G.

Figure 4H:
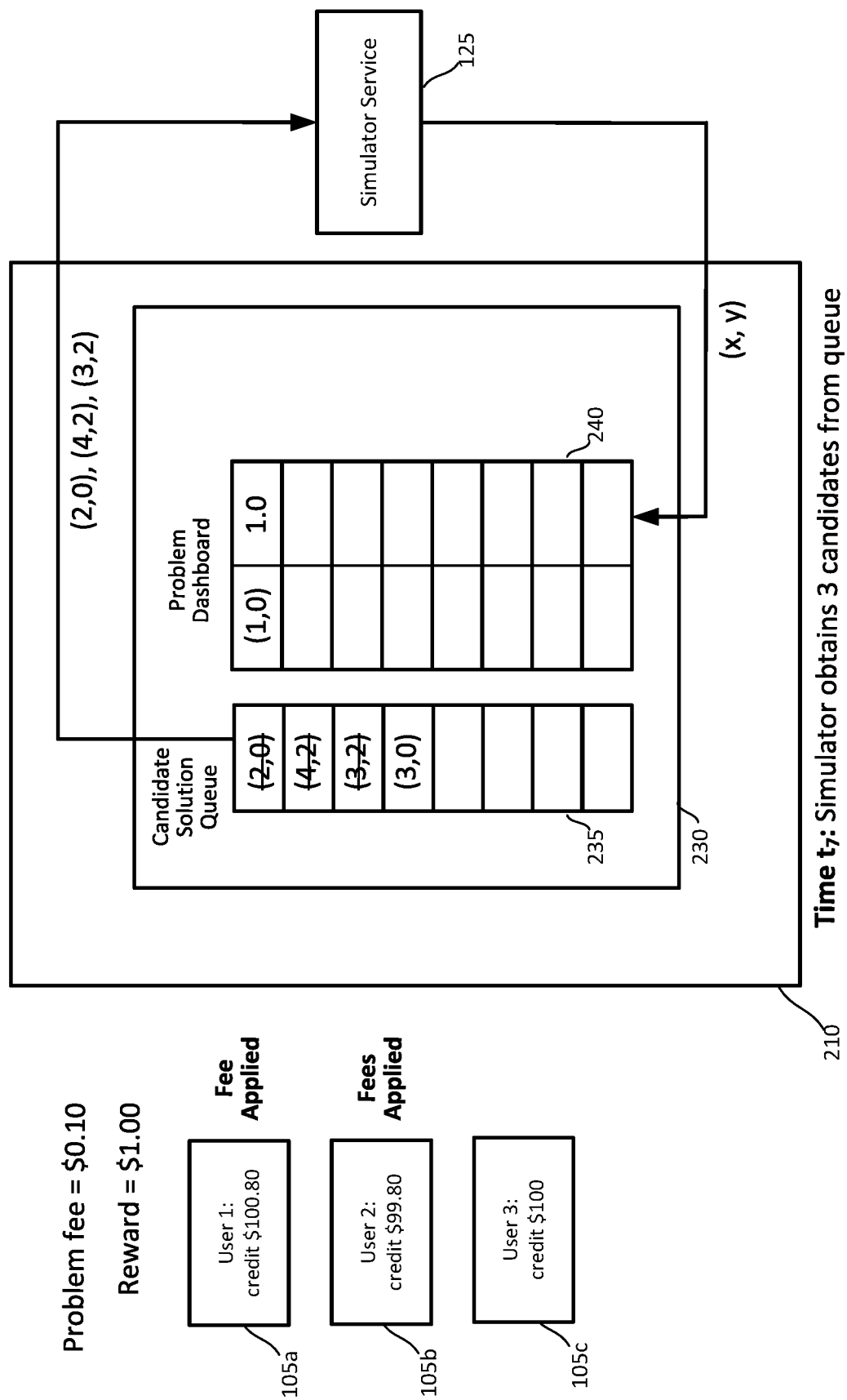

FIG. 4H is a diagram showing the state of the problem information instance 230 associated with the black-box optimization problem at an eighth time $t_7$. At the eighth time, the simulator service 125 requests three candidate solution associated with the black-box problem from the exchange service 210. Responsive to the request from the simulator service 125, the exchange services 210 sends the first three entries from the candidate solution queue 235 to the simulator service 125 and removes the first three entries from the candidate solution queue 235. The exchange service 210 also debits the problem submission fee for one solution from the user account of User 1 and debits two problem solution fees from User 2. One entry remains in the candidate solution queue 235 after the first three entries are removed from the candidate solution queue 235.

Figure 4I:
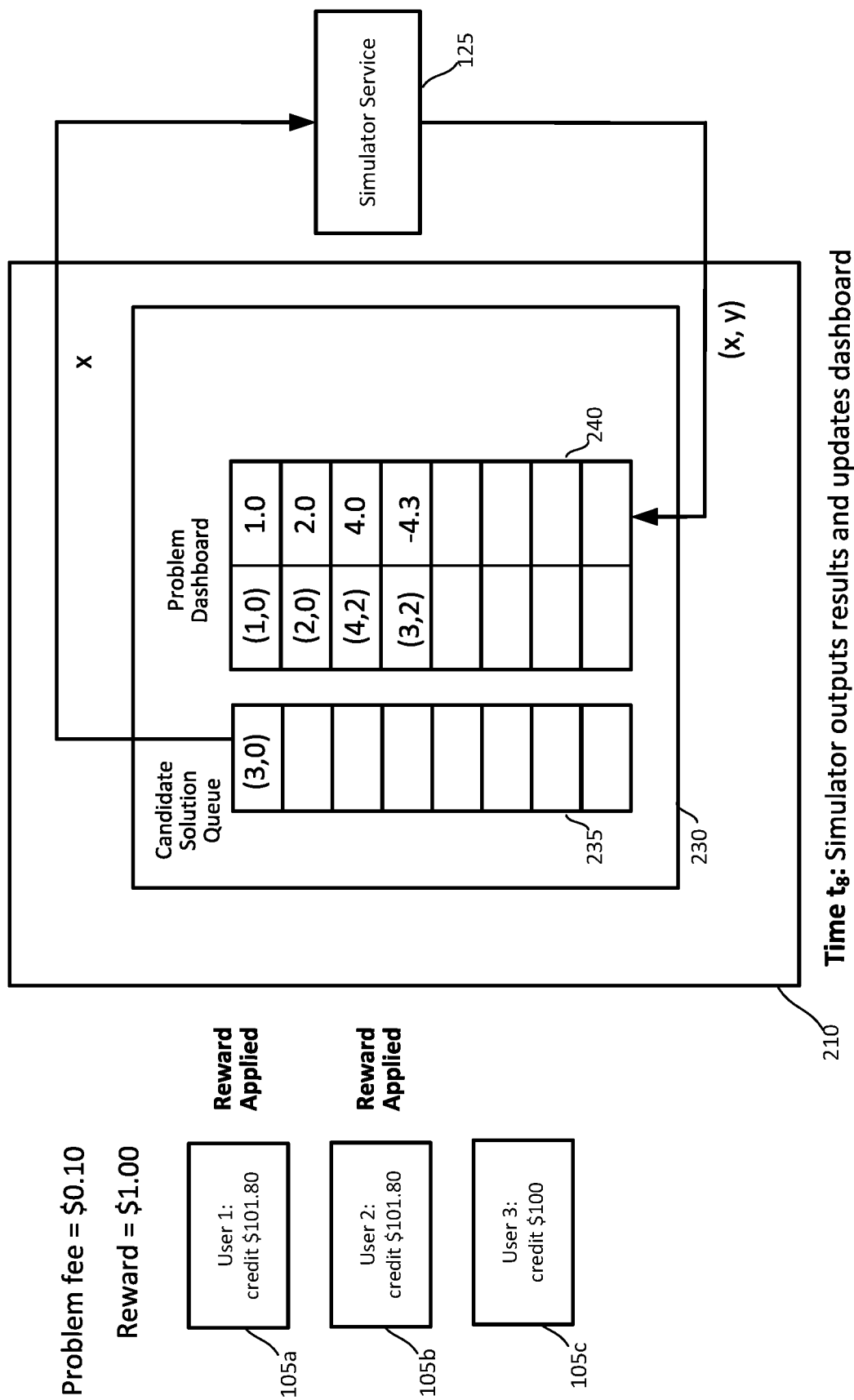

FIG. 4I is a diagram showing the state of the problem information instance 230 associated with the black-box optimization problem at a nineth time $t_8$. At the nineth time, the simulator service 125 determines the candidate solution results for each of the three candidate solutions obtained from the exchange service 210 in the eighth time $t_7$. The simulator service 125 may send a candidate solution results message for each of the three candidate solutions that have been processed. The exchange service 210 updates the problem dashboard 240 to include the candidate solutions and the candidate solution result associated with the candidate solution. In the example shown in FIG. 4E, the three candidate solutions have each earned a $1.00 reward. The candidate solution (2,0) submitted by User 1 earned $1 for providing an improved result. The candidate solutions (4, 2) and (3, 2) submitted by User 2 also earned $1 each for providing an improved result. The exchange service 210 may send a notification to User 1 and User 2 that the rewards have been awarded. The rewards are credited to the respective user accounts of Users 1 and 2. As indicated above, rewards may be debited from an account associated with the simulator service 125, and the reward may be funded by the submitter of the black-box optimization problem.

Figure 5:
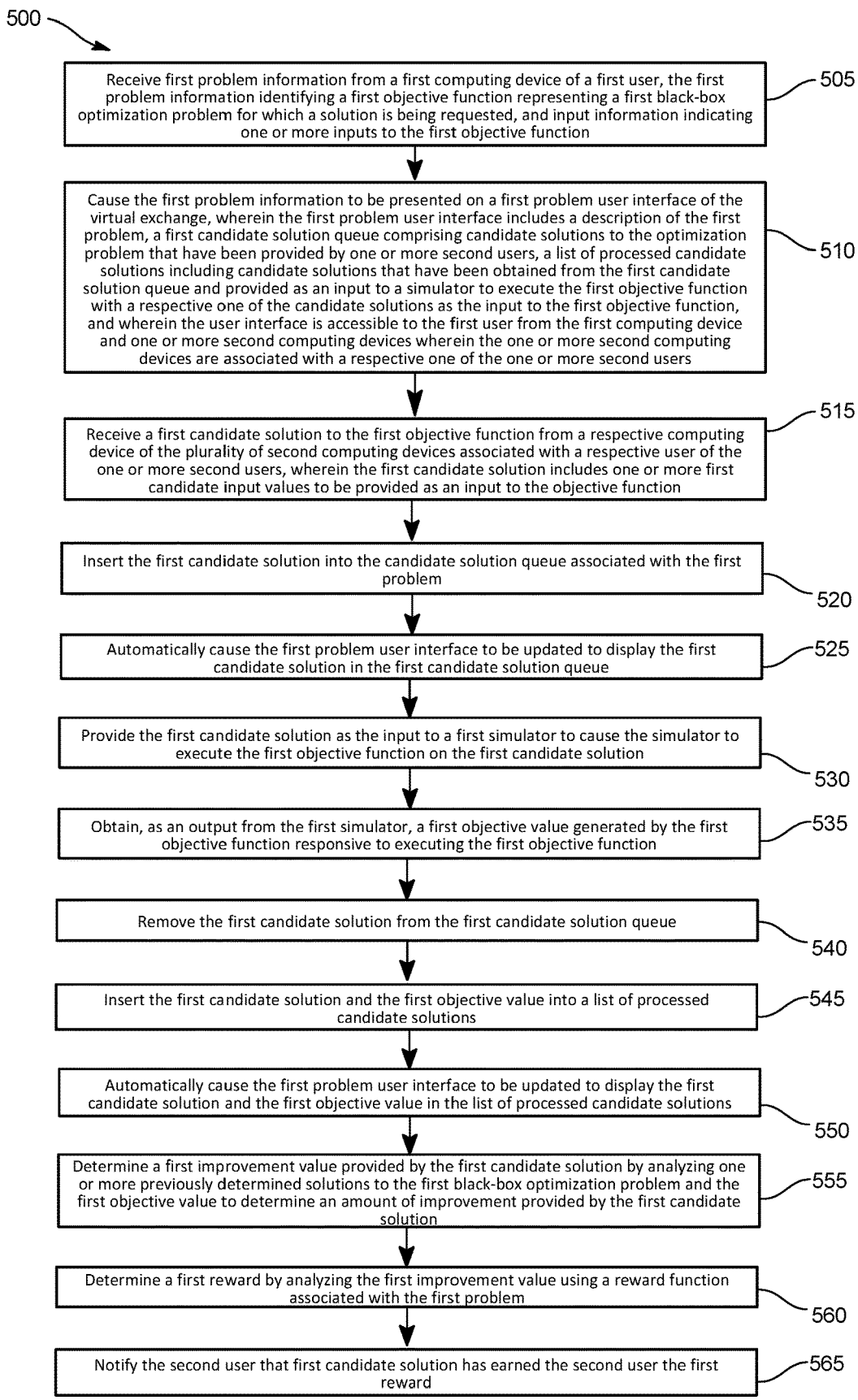
FIG. 5 is a flow chart of an example process for providing a distributed timer.

FIG. 5 is a flow chart of an example process 500 for obtaining solutions to black-box optimization problems. The process 500 may be implemented by the exchange service 110 discussed in the preceding examples.

The process 500 may include an operation 505 of receiving first problem information from a first computing device of a first user. The first problem information identifies a first objective function representing a first black-box optimization problem for which a solution is being requested, and input information indicating one or more inputs to the first objective function. As shown in FIGS. 2, 3, and 4A-4I, a user device 105 associated with a first user requesting may send a request to the exchange service 110 to create a new problem information instance 230 associated with the problem. The problem information instance 230 may be stored in the transactions database 265 maintained by the exchange service 110.

The process 500 may include an operation 510 of causing the first problem information to be presented on a first problem user interface of the virtual exchange provided by the exchange service 110, such as the user interface 1005 shown in FIG. 10 and the user interface 1105 shown in FIG. 11. The first problem user interface includes a description of the first problem, a graphical first candidate solution queue 235 comprising candidate solutions to the optimization problem that have been provided by one or more second users, a list of processed candidate solutions shown in a problem dashboard, such as the problem dashboard 240 shown in FIGS. 2, 3, and 4A-4I. The problem dashboard 240 includes candidate solutions that have been obtained from the first candidate solution queue and provided as an input to a simulator service 125 to execute the first objective function with a respective one of the candidate solutions as the input to the first objective function. The user interface 230 is accessible to the first user from the first computing device and one or more second computing devices wherein the one or more second computing devices are associated with a respective one of the one or more second users.

The process 500 may include an operation 515 of receiving a first candidate solution to the first objective function from a respective computing device of the plurality of second computing devices associated with a respective user of the one or more second users, wherein the first candidate solution includes one or more first candidate input values to be provided as an input to the objective function. FIGS. 4B and 4C show examples of the candidate solution queue 230 associated with a problem information instance 230 being updated to include new candidate solutions. The user device 105 of a user or the web-based front end may send a submit candidate solution message to the exchange service 110 that identifies a candidate solution associated with the first problem. In some implementations, the user of the user device 105 may select the problem from a graphical user interface, such as user interface 905 shown in FIG. 9 which may provide a list of problems for which optimization are currently being sought. The user may select the "Details" button to cause the user device to display the user interface 1005 shown in FIG. 10. The example user interfaces 905 and 1005 are examples of one possible implementation of the user interfaces that may be presented to a user. In some implementations, the user may have already accessed the user interface 1005 and may activate the submit candidate solution button 1010 to cause the user device 105 to send the submit candidate solution request to the exchange service 110. Activating the submit candidate solution button 1010 may cause a submission user interface to be displayed on the user device 105. The submission user interface may permit the user to select a file to be provided to the exchange service 110 as the candidate solution. In other implementations, the user interface may include a means for receiving textual input from the user, which may comprise alphanumeric characters. The user may type in the candidate solution information and/or past the textual input representing the candidate solution.

The process 500 may include an operation 520 of inserting the first candidate solution into the candidate solution queue associated with the first problem. As shown in FIGS. 4B and 4C, the exchange service 110 inserts the candidate solution provided by the user device 105 of the problem associated with the candidate solution. The exchange service 110 may create an instance of a candidate solution data structure in the transactions database 265. The candidate solution data structure may be similar to the candidate solution data structure 875 shown in FIG. 8B and include a problem identifier 810, a candidate solution identifier 830, and a candidate solution result value 835, and the candidate solution received field 840. The candidate solution result value field 835 may be populated based on candidate solution information included with the submit candidate solution message, and the problem identifier field 810 and the candidate solution identifier field 830 may be automatically populated by the control logic 250 of the exchange service 110.

The process 500 may include an operation 525 of automatically causing the first problem user interface to be updated to display the first candidate solution in the first candidate solution queue 235. The exchange service 110 may cause the user interface 1005 shown in FIG. 10 and/or the user interface 1105 shown in FIG. 11 to be updated to include a representation of the candidate solution. The candidate solution queue 235 includes candidate solutions that have been submitted by one or more users but have not yet been tested by the user requesting the solution to the problem to determine whether the candidate solutions provide an improved result.

The process 500 may include an operation 530 of providing the first candidate solution as the input to a first simulator to cause the simulator to execute the first objective function on the first candidate solution. The user requesting the solution may request one or more candidate solutions from the candidate solution queue 235. The user device 105 of the user who submitted the problem may send a process candidate solution message to the simulator service 125 to run a simulation of the black-box optimization problem for a candidate solution included in the candidate solution queue 235. The candidate solution queue 235 may be a FIFO queue. The control logic 250 of the exchange service 210 may send the candidate solution from the head of the candidate solution queue 235 to the simulator service 125 responsive to the process candidate solution message.

The process 500 may include an operation 535 of obtaining, as an output from the first simulator, a first objective value generated by the first objective function responsive to executing the first objective function. The simulator service 125 may send a candidate solution results message to the exchange service 210 that includes the candidate solution result value that was submitted to the simulator service 125 and the candidate solution result produced by the simulator service 125 also referred to as the "objective value" of the objective function associated with the black-box optimization problem. The exchange service 110 may store the results received from the simulator service 125 in a candidate solution information data structure 875 shown in FIG. 8B.

The process 500 may include an operation 540 of removing the first candidate solution from the first candidate solution queue. The control logic 250 of the exchange service 110 may remove the selected candidate solution from the candidate solution queue 235 responsive to receiving the candidate solution results messages from the simulator service 125.

The process 500 may include an operation 545 of inserting the first candidate solution and the first objective value into a list of processed candidate solutions. The exchange service 110 may insert the first candidate solution received from the simulator service 125 into the problem dashboard 240 associated with the first black-box optimization problem. Examples of the exchange service 110 updating the problem dashboard 240 are shown in FIGS. 3 and 4A-4I.

The process 500 may include an operation 550 of automatically causing the first problem user interface to be updated to display the first candidate solution and the first objective value in the list of processed candidate solutions. FIGS. 10 and 11 show examples of user interfaces that the exchange service 110 may cause to be displayed on the user device 105 who access the virtual exchange provided the exchange service 110.

The process 500 may include an operation 555 of determining a first improvement value provided by the first candidate solution by analyzing one or more previously determined solutions to the first black-box optimization problem and the first objective value to determine an amount of improvement provided by the first candidate solution. The first improvement value may be determined by subtracting a current maximum objective value associated with a solution for optimizing the objection function from the first objective value to determine the first improvement value. The first objective function may be optimized by maximizing or minimizing the objective value depending upon the particular black-box optimization.

The process 500 may include an operation 560 of determining a first reward by analyzing the first improvement value using a reward function associated with the first problem. The user who submitted the black-box optimization problem may define a reward function that may determine whether a particular candidate solution should be awarded a reward and how much the reward should be based on the improvement value associated with the candidate solution. In some implementations, the reward function may refer to a reward schedule which may map a range of improvement values to a particular award. In an example implementation, a first reward may be awarded for an improvement value that falls within the first range of values, a second award may be awarded for an improvement that falls within a second range of values, and no reward may be awarded for an improvement values that falls outside of the first and second ranges of values. In some implementations, the reward function may provide a single reward amount to candidate solutions that provide an improvement of at least a threshold amount.

The process 500 may include an operation 565 of notifying the second user that first candidate solution has earned the second user the first reward. The exchange service 210 may send a reward notification message to the user device 105 associated with the second user. The reward notification message may indicate include information that identifies the black-box optimization problem for which the candidate solution was provided, information identifying the candidate solution for which the reward was earned, and a description of the reward provided. The reward notification message may indicate an amount of money that has been credited to the user's user account on the exchange service 110. The reward notification message may include instructions for how the user may obtain the funds credited to their user account. The exchange service 210 may be configured to provide a user interface that may be used to check the user's account balance and to provide means for the user to obtain the funds from their user account. The exchange service 210 may provide means for the user to transfer funds from their user account to a bank account and/or to obtain a check for at least a portion of the account balance.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
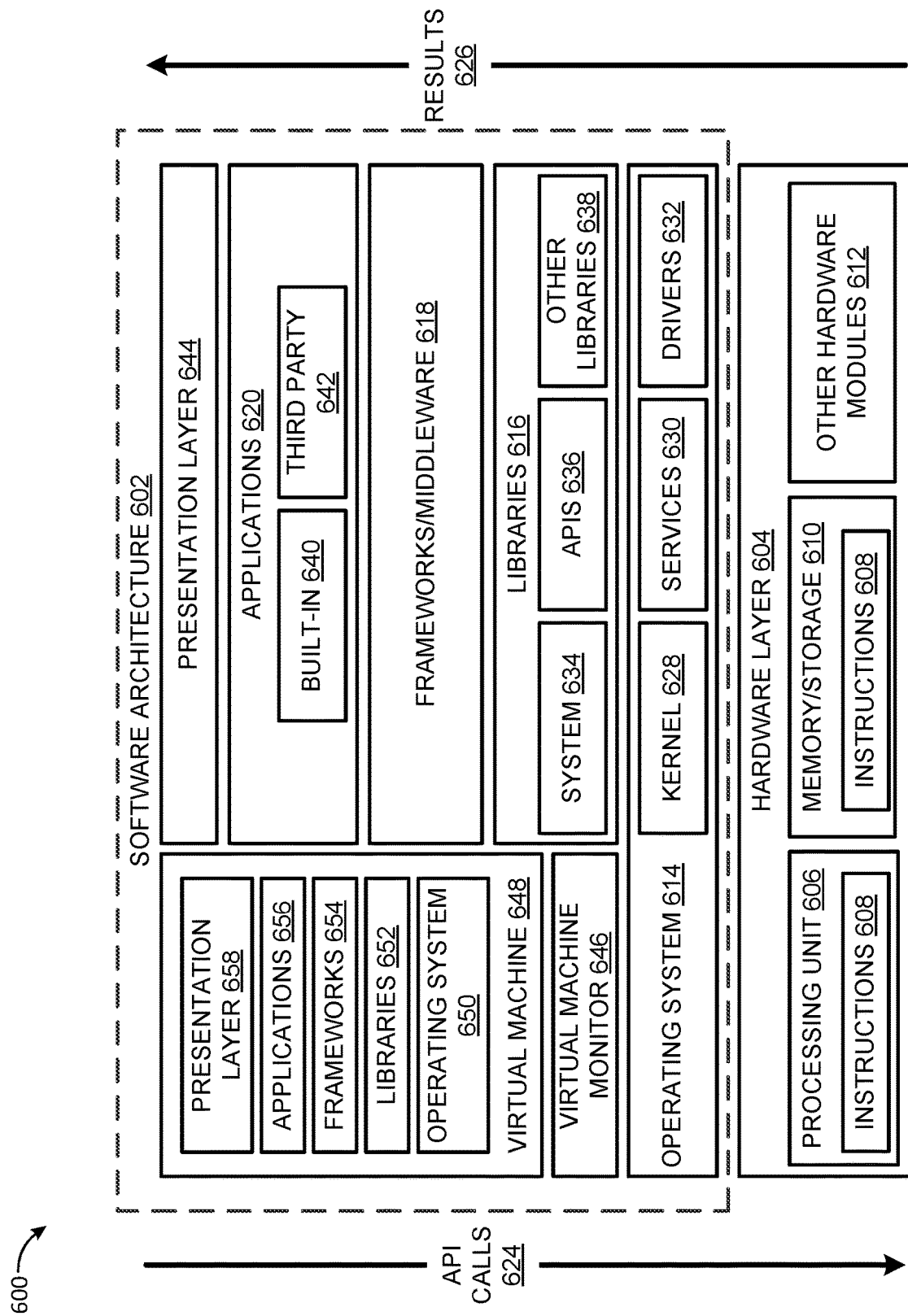
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
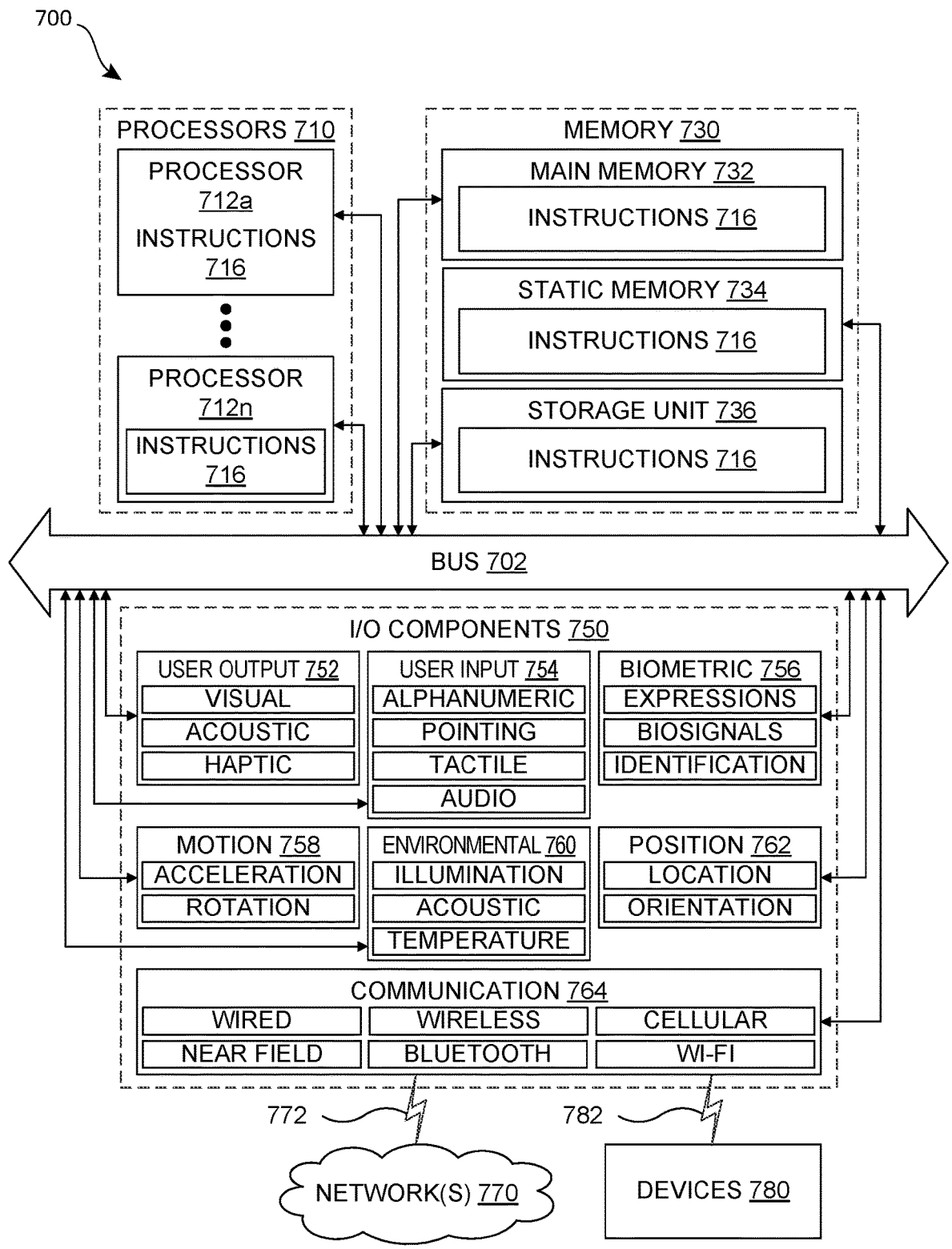
FIG. 7 is a block diagram showing components of an example machine configured to read instructions from a machine-readable medium and perform any of the features described herein.
Figure 12:
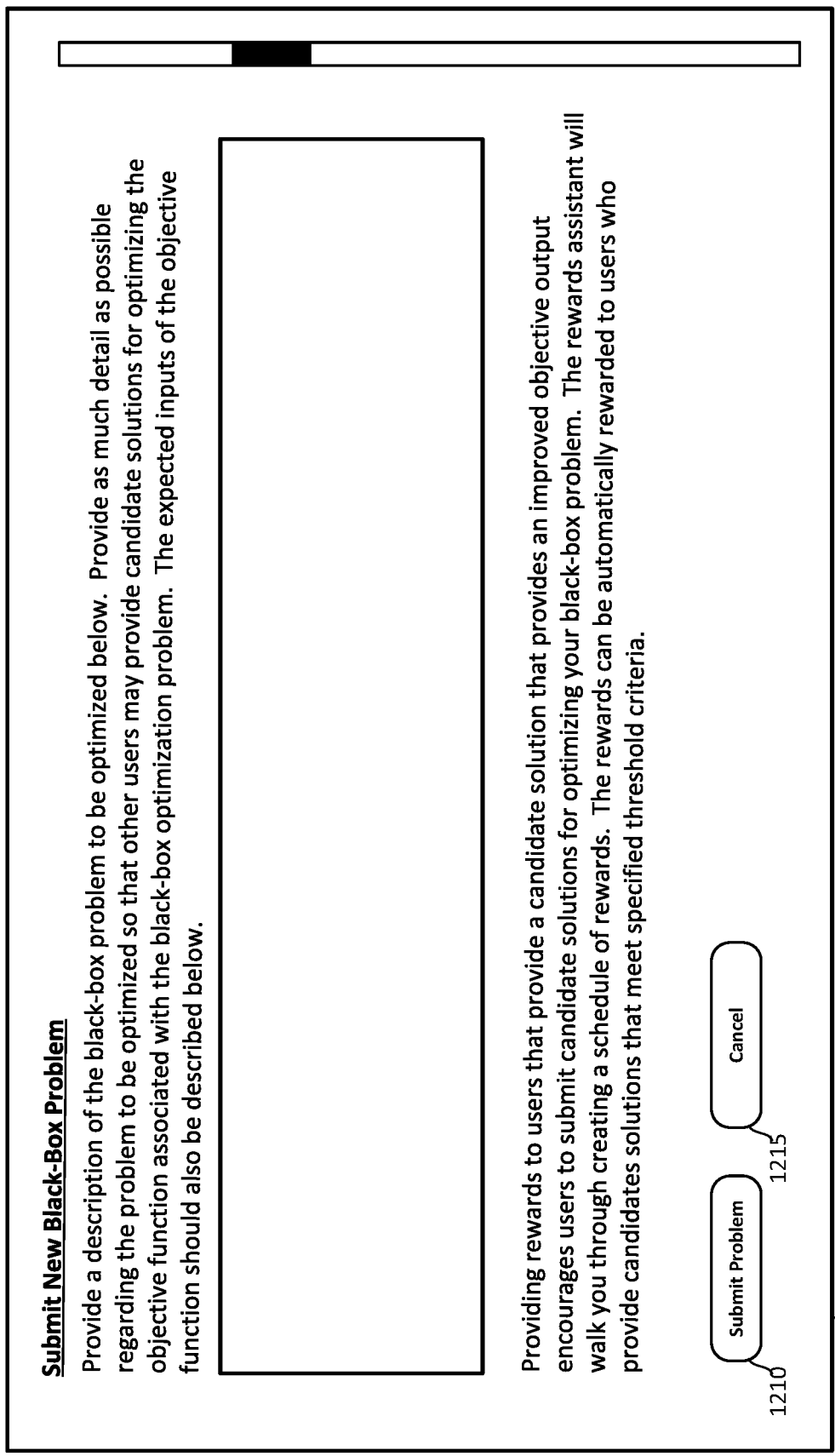
FIG. 12 is a diagram of an example user interface for submitting a new black-box optimization problem to the exchange service.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   receiving first problem information from a first computing device of a first user, the first problem information identifying a first objective function representing a first black-box optimization problem for which a solution is being requested from one or more second users, and input information indicating one or more inputs to the first objective function;
   causing the first problem information to be presented on a first problem user interface of a virtual exchange, the virtual exchange reducing one or more of computing, network, and memory resource for optimizing objective functions associated with black-box problems by providing a collaborative environment in which users submit candidate solutions for optimizing a respective objective function associated with a respective black-box problem, wherein the first problem user interface includes:
   a description of the first problem,
   a first candidate solution queue comprising candidate solutions to the optimization problem that have been provided by one or more second users, and
   a list of processed candidate solutions including candidate solutions that have been obtained from the first candidate solution queue and provided as an input to a first simulator to execute the first objective function with a respective one of the candidate solutions as the input to the first objective function;
   receiving a first candidate solution to the first objective function from a second computing device of a second user, wherein the first candidate solution includes one or more first candidate input values to be provided as an input to the objective function;
   inserting the first candidate solution into the candidate solution queue associated with the first problem;
   storing information associated with the first candidate solution in a candidate solution information data structure stored in a memory of the data processing system, wherein storing the information in the candidate solution information data structure includes:
   determining that the first candidate solution exceeds a size of a candidate solution field included in the candidate solution information data structure allocated for storing the first candidate solution, storing the first candidate solution in a memory location external to the candidate information data structure, and
inserting a link to the memory location in the candidate solution field of the candidate solution information data structure;
providing the first candidate solution as the input to a first simulator service in response to the candidate solution request;
obtaining, as an output from the first simulator of the simulator service, a first objective value generated by the first objective function responsive to executing the first objective function on the first candidate solution;
removing the first candidate solution from the first candidate solution queue responsive to obtaining the first objective value;
inserting the first candidate solution and the first objective value into the list of processed candidate solutions;
automatically causing the first problem user interface to be updated to display the first candidate solution and the first objective value in the list of processed candidate solutions;
determining a first improvement value provided by the first candidate solution by analyzing one or more previously determined solutions to the first black-box optimization problem and the first objective value to determine an amount of improvement provided by the first candidate solution; and
compensating the second user for the first candidate solution based on the improvement value provided by the first candidate solution.

2. The data processing system of claim 1, wherein all entries of the first candidate solution queue and all entries of the list of processed candidate solutions are visible to all registered users accessing the first problem user interface.

3. The data processing system of claim 1, wherein the machine-readable medium includes instructions configured to cause the processor to perform:
causing to be displayed a first dashboard interface that presents a plurality of black-box optimization problems including the first black-box optimization problem, wherein the first dashboard interface provides means for causing a problem-specific user interface to be displayed for each of the plurality of black-box optimization problems.

4. The data processing system of claim 1, wherein the first candidate solution comprises a vector comprising a plurality input values for the first objective function.

5. A method for operating, in a data processing system, a virtual exchange for obtaining solutions to black-box optimization problems, the method comprising:
receiving first problem information from a first computing device of a first user, the first problem information identifying a first objective function representing a first black-box optimization problem for which a solution is being requested from one or more second users, and input information indicating one or more inputs to the first objective function;
causing the first problem information to be presented on a first problem user interface of a virtual exchange, the virtual exchange reducing one or more of computing, network, and memory resource for optimizing objective functions associated with black-box problems by providing a collaborative environment in which users submit candidate solutions for optimizing a respective objective function associated with a respective black-box problem, wherein the first problem user interface includes:
a description of the first problem,
a first candidate solution queue comprising candidate solutions to the optimization problem that have been provided by one or more second users, and
a list of processed candidate solutions including candidate solutions that have been obtained from the first candidate solution queue and provided as an input to a first simulator to execute the first objective function with a respective one of the candidate solutions as the input to the first objective function;
receiving a first candidate solution to the first objective function from a second computing device of a second user, wherein the first candidate solution includes one or more first candidate input values to be provided as an input to the objective function;
inserting the first candidate solution into the candidate solution queue associated with the first problem;
storing information associated with the first candidate solution in a candidate solution information data structure stored in a memory of the data processing system, wherein storing the information in the candidate solution information data structure includes:
determining that the first candidate solution exceeds a size of a candidate solution field included in the candidate solution information data structure allocated for storing the first candidate solution,
storing the first candidate solution in a memory location external to the candidate information data structure, and
inserting a link to the memory location in the candidate solution field of the candidate solution information data structure;
providing the first candidate solution as the input to a first simulator service in response to the candidate solution request;
obtaining, as an output from the first simulator of the simulator service, a first objective value generated by the first objective function responsive to executing the first objective function on the first candidate solution;
removing the first candidate solution from the first candidate solution queue responsive to obtaining the first objective value;
inserting the first candidate solution and the first objective value into the list of processed candidate solutions;
automatically causing the first problem user interface to be updated to display the first candidate solution and the first objective value in the list of processed candidate solutions;
determining a first improvement value provided by the first candidate solution by analyzing one or more previously determined solutions to the first black-box optimization problem and the first objective value to determine an amount of improvement provided by the first candidate solution; and
compensating the second user for the first candidate solution based on the improvement value provided by the first candidate solution.

6. The method of claim 5, wherein all entries of the first candidate solution queue and all entries of the list of processed candidate solutions are visible to all registered users accessing the first problem user interface.

7. The method of claim 5, further comprising:
causing to be displayed a first dashboard interface that presents a plurality of black-box optimization problems including the first black-box optimization problem, wherein the first dashboard interface provides means for causing a problem-specific user interface to be displayed for each of the plurality of black-box optimization problems.

8. The method of claim 5, wherein the first candidate solution comprises a vector comprising a plurality input values for the first objective function.

9. A machine-readable medium on which are stored instructions that, when executed, cause a processor of a programmable device to perform operations of:

receiving first problem information from a first computing device of a first user, the first problem information identifying a first objective function representing a first black-box optimization problem for which a solution is being requested from one or more second users, and input information indicating one or more inputs to the first objective function;

causing the first problem information to be presented on a first problem user interface of a virtual exchange, the virtual exchange reducing one or more of computing, network, and memory resource for optimizing objective functions associated with black-box problems by providing a collaborative environment in which users submit candidate solutions for optimizing a respective objective function associated with a respective black-box problem wherein the first problem user interface includes:
  a description of the first problem,
  a first candidate solution queue comprising candidate solutions to the optimization problem that have been provided by one or more second users, and
  a list of processed candidate solutions including candidate solutions that have been obtained from the first candidate solution queue and provided as an input to a first simulator to execute the first objective function with a respective one of the candidate solutions as the input to the first objective function;

receiving a first candidate solution to the first objective function from a second computing device of a second user, wherein the first candidate solution includes one or more first candidate input values to be provided as an input to the objective function;

inserting the first candidate solution into the candidate solution queue associated with the first problem;

storing information associated with the first candidate solution in a candidate solution information data structure stored in a memory of the programmable device, wherein storing the information in the candidate solution information data structure includes:
  determining that the first candidate solution exceeds a size of a candidate solution field included in the candidate solution information data structure allocated for storing the first candidate solution,
  storing the first candidate solution in a memory location external to the candidate information data structure, and
  inserting a link to the memory location in the candidate solution field of the candidate solution information data structure;

providing the first candidate solution as the input to a first simulator service in response to the candidate solution request;

obtaining, as an output from the first simulator of the simulator service, a first objective value generated by the first objective function responsive to executing the first objective function on the first candidate solution;

removing the first candidate solution from the first candidate solution queue responsive to obtaining the first objective value;

inserting the first candidate solution and the first objective value into the list of processed candidate solutions;

automatically causing the first problem user interface to be updated to display the first candidate solution and the first objective value in the list of processed candidate solutions;

determining a first improvement value provided by the first candidate solution by analyzing one or more previously determined solutions to the first black-box optimization problem and the first objective value to determine an amount of improvement provided by the first candidate solution; and compensating the second user for the first candidate solution based on the improvement value provided by the first candidate solution.

10. The machine-readable medium of claim 9, wherein all entries of the first candidate solution queue and all entries of the list of processed candidate solutions are visible to all registered users accessing the first problem user interface.

11. The machine-readable medium of claim 9, further comprising instructions configured to cause the processor to perform:

causing to be displayed a first dashboard interface that presents a plurality of black-box optimization problems including the first black-box optimization problem, wherein the first dashboard interface provides means for causing a problem-specific user interface to be displayed for each of the plurality of black-box optimization problems.

* * * * *